US011198532B2

(12) United States Patent
Amend, Jr. et al.

(10) Patent No.: US 11,198,532 B2
(45) Date of Patent: Dec. 14, 2021

(54) SYSTEMS AND METHODS FOR DYNAMIC PROCESSING OF OBJECTS USING BOX TRAY ASSEMBLIES

(71) Applicant: Berkshire Grey, Inc., Bedford, MA (US)

(72) Inventors: John Richard Amend, Jr., Belmont, MA (US); William Chu-Hyon McMahan, Cambridge, MA (US); Joseph Romano, Arlington, MA (US); Victoria Hinchey, Winchester, MA (US); Jennifer Eileen King, Oakmont, PA (US); Thomas Wagner, Concord, MA (US)

(73) Assignee: Berkshire Grey, Inc., Bedford, MA (US)

( * ) Notice: Subject to any disclaimer, the term of this patent is extended or adjusted under 35 U.S.C. 154(b) by 251 days.

(21) Appl. No.: 16/291,506

(22) Filed: Mar. 4, 2019

(65) Prior Publication Data

US 2019/0270537 A1    Sep. 5, 2019

Related U.S. Application Data

(60) Provisional application No. 62/638,724, filed on Mar. 5, 2018.

(51) Int. Cl.
*B65D 5/00* (2006.01)
*B25J 9/00* (2006.01)
(Continued)

(52) U.S. Cl.
CPC ............ *B65D 5/001* (2013.01); *B25J 9/0093* (2013.01); *B25J 9/1669* (2013.01); *B65D 5/4212* (2013.01); *B65G 1/1378* (2013.01);

*G05B 19/4182* (2013.01); *G06Q 10/08* (2013.01); *G06Q 10/087* (2013.01);
(Continued)

(58) Field of Classification Search
USPC .......................................................... 53/579
See application file for complete search history.

(56) References Cited

U.S. PATENT DOCUMENTS

| 3,592,326 A | 7/1971 | Zimmerle et al. |
| 4,678,390 A | 7/1987 | Bonneton et al. |

(Continued)

FOREIGN PATENT DOCUMENTS

| AT | 299790 B | 6/1972 |
| AU | 2006204622 A1 | 3/2007 |

(Continued)

OTHER PUBLICATIONS

Communication pursuant to Rules 161(1) and 162 EPC issued by the European Patent Office in related European Patent Application No. 18807485.0 dated Oct. 16, 2020, 3 pages.

(Continued)

*Primary Examiner* — Anna K Kinsaul
*Assistant Examiner* — Chinyere J Rushing-Tucker
(74) *Attorney, Agent, or Firm* — Gesmer Updegrove LLP

(57) ABSTRACT

A box handling system is disclosed for use in an object processing system. The box handling system includes a box tray including a recessed area for receiving a box, and the recessed area includes a plurality of floor and edge portions for receiving the box that contains objects to be processed.

52 Claims, 27 Drawing Sheets

(51) Int. Cl.
*G05B 19/418* (2006.01)
*B25J 9/16* (2006.01)
*B65D 5/42* (2006.01)
*G06Q 10/08* (2012.01)
*B65G 1/137* (2006.01)

(52) U.S. Cl.
CPC ...... *B65G 1/1376* (2013.01); *B65G 2201/025* (2013.01); *B65G 2201/0258* (2013.01); *B65G 2203/0216* (2013.01); *B65G 2203/041* (2013.01); *B65G 2203/044* (2013.01); *G05B 2219/31078* (2013.01); *G05B 2219/39102* (2013.01); *G05B 2219/39106* (2013.01); *G05B 2219/40554* (2013.01)

(56) References Cited

U.S. PATENT DOCUMENTS

| | | | |
|---|---|---|---|
| 4,722,653 A | 2/1988 | Williams et al. | |
| 4,759,439 A | 7/1988 | Hartlepp | |
| 4,846,335 A | 7/1989 | Hartlepp | |
| 4,895,242 A | 1/1990 | Michel | |
| 5,190,162 A | 3/1993 | Hartlepp | |
| 5,352,081 A * | 10/1994 | Tanaka | B65G 1/1376 186/2 |
| 5,839,566 A | 11/1998 | Bonnet | |
| 6,505,093 B1 | 1/2003 | Thatcher et al. | |
| 6,579,053 B1 | 6/2003 | Grams et al. | |
| 6,685,031 B2 | 2/2004 | Takizawa | |
| 6,762,382 B1 | 7/2004 | Danelski | |
| 6,897,395 B2 | 5/2005 | Shiibashi et al. | |
| 8,776,694 B2 | 7/2014 | Rosenwinkel et al. | |
| 9,102,336 B2 | 8/2015 | Rosenwinkel | |
| 9,272,845 B2 | 3/2016 | Honkanen et al. | |
| 9,481,518 B2 | 11/2016 | Neiser | |
| 9,687,982 B1 | 6/2017 | Jules et al. | |
| 9,751,693 B1 | 9/2017 | Battles et al. | |
| 9,926,138 B1 | 3/2018 | Brazeau et al. | |
| 10,007,827 B2 | 6/2018 | Wagner et al. | |
| 10,029,865 B1 | 7/2018 | McCalib, Jr. et al. | |
| 10,843,333 B2 | 11/2020 | Wagner et al. | |
| 2001/0038784 A1 | 11/2001 | Peltomaki | |
| 2002/0087231 A1 | 7/2002 | Lewis et al. | |
| 2002/0092801 A1 | 7/2002 | Dominguez | |
| 2002/0157919 A1 | 10/2002 | Sherwin | |
| 2002/0179502 A1 | 12/2002 | Cerutti et al. | |
| 2003/0038065 A1 | 2/2003 | Pippin et al. | |
| 2007/0132580 A1 | 6/2007 | Ambrefe, Jr. | |
| 2007/0185613 A1 | 8/2007 | Feldenzer | |
| 2007/0209976 A1 | 9/2007 | Worth et al. | |
| 2008/0181753 A1 | 7/2008 | Bastian et al. | |
| 2010/0122942 A1 | 5/2010 | Harres et al. | |
| 2010/0318216 A1 | 12/2010 | Faivre et al. | |
| 2011/0144798 A1 | 6/2011 | Freudelsperger | |
| 2011/0238207 A1 | 9/2011 | Bastian, II et al. | |
| 2011/0243707 A1 | 10/2011 | Dumas et al. | |
| 2012/0118699 A1 | 5/2012 | Buuchmann et al. | |
| 2012/0177465 A1 | 7/2012 | Koholka | |
| 2013/0110280 A1 | 5/2013 | Folk | |
| 2014/0244026 A1 | 8/2014 | Neiser | |
| 2014/0291112 A1 | 10/2014 | Lyon et al. | |
| 2014/0364998 A1 | 12/2014 | Neiser et al. | |
| 2015/0098775 A1 | 4/2015 | Razumov | |
| 2015/0104286 A1* | 4/2015 | Hansl | B65G 37/00 414/800 |
| 2015/0114799 A1 | 4/2015 | Hansl et al. | |
| 2015/0375880 A1 | 12/2015 | Ford et al. | |
| 2016/0007737 A1 | 1/2016 | Clark et al. | |
| 2016/0221187 A1 | 8/2016 | Bradski et al. | |
| 2016/0221762 A1 | 8/2016 | Schroader | |
| 2016/0244262 A1 | 8/2016 | O'Brien et al. | |
| 2016/0355337 A1 | 12/2016 | Lert et al. | |
| 2017/0043953 A1 | 2/2017 | Battles et al. | |
| 2017/0076251 A1 | 3/2017 | Simske et al. | |
| 2017/0080566 A1 | 3/2017 | Stubbs et al. | |
| 2017/0080571 A1 | 3/2017 | Wagner et al. | |
| 2017/0106532 A1 | 4/2017 | Wellman et al. | |
| 2017/0121113 A1 | 5/2017 | Wagner et al. | |
| 2017/0136632 A1 | 5/2017 | Wagner et al. | |
| 2017/0157648 A1 | 6/2017 | Wagner et al. | |
| 2017/0225330 A1 | 8/2017 | Wagner et al. | |
| 2017/0320625 A1* | 11/2017 | Eckert | B65D 11/1873 |
| 2017/0322561 A1 | 11/2017 | Stiernagle | |
| 2017/0349385 A1 | 12/2017 | Moroni et al. | |
| 2017/0369244 A1 | 12/2017 | Battles et al. | |
| 2018/0085788 A1 | 3/2018 | Engel et al. | |
| 2018/0130015 A1 | 5/2018 | Jones et al. | |
| 2018/0244473 A1 | 8/2018 | Mathi et al. | |
| 2018/0265311 A1 | 9/2018 | Wagner et al. | |
| 2018/0273295 A1 | 9/2018 | Wagner et al. | |
| 2018/0273296 A1 | 9/2018 | Wagner et al. | |
| 2018/0273297 A1 | 9/2018 | Wagner et al. | |
| 2018/0273298 A1 | 9/2018 | Wagner et al. | |
| 2018/0282065 A1 | 10/2018 | Wagner et al. | |
| 2018/0282066 A1 | 10/2018 | Wagner et al. | |
| 2018/0312336 A1 | 11/2018 | Wagner et al. | |
| 2018/0327198 A1 | 11/2018 | Wagner et al. | |
| 2019/0022702 A1 | 1/2019 | Vegh et al. | |

FOREIGN PATENT DOCUMENTS

| | | |
|---|---|---|
| CH | 432368 A | 3/1967 |
| CN | 1081963 A | 2/1994 |
| CN | 201520176 U | 7/2010 |
| CN | 102112688 A | 6/2011 |
| CN | 102131718 A | 7/2011 |
| CN | 202147556 U | 2/2012 |
| CN | 102390701 A | 3/2012 |
| CN | 202918665 U | 5/2013 |
| CN | 104246801 A | 12/2014 |
| CN | 104379460 A | 2/2015 |
| CN | 105853219 A | 8/2016 |
| CN | 106395225 A | 2/2017 |
| CN | 107250004 A | 10/2017 |
| CN | 107708940 A | 2/2018 |
| CN | 108778636 A | 11/2018 |
| CN | 110001318 A | 7/2019 |
| DE | 4127933 A1 | 2/1993 |
| DE | 102005061309 A1 | 7/2007 |
| DE | 102006057658 A1 | 6/2008 |
| DE | 102007023909 A1 | 11/2008 |
| DE | 102007038834 A1 | 2/2009 |
| DE | 102010002317 A1 | 8/2011 |
| EP | 0235488 A1 | 9/1987 |
| EP | 1995192 A2 | 11/2008 |
| EP | 3112295 A1 | 1/2017 |
| FR | 2832654 A1 | 5/2003 |
| JP | 54131278 A | 10/1979 |
| JP | S63310406 A | 12/1988 |
| JP | H0395001 A | 4/1991 |
| JP | 2000238906 A | 9/2000 |
| JP | 2007182286 A | 7/2007 |
| JP | 2008037567 A | 2/2008 |
| JP | 2014141313 A | 8/2014 |
| KR | 100836285 B1 | 6/2008 |
| WO | 03074201 A1 | 9/2003 |
| WO | 2007009136 A1 | 1/2007 |
| WO | 2008091733 A2 | 7/2008 |
| WO | 2010017872 A1 | 2/2010 |
| WO | 2011038442 A2 | 4/2011 |
| WO | 2013178431 A1 | 12/2013 |
| WO | 2014166650 A1 | 10/2014 |
| WO | 2015035300 A1 | 3/2015 |
| WO | 2015118171 A1 | 8/2015 |
| WO | 2017036780 A1 | 3/2017 |
| WO | 2018175466 A1 | 9/2018 |
| WO | 2018176033 A1 | 9/2018 |

OTHER PUBLICATIONS

Communication pursuant to Rules 161(1) and 162 EPC issued by the European Patent Office in related European Patent Application No. 19716256.3 dated Oct. 13, 2020, 3 pages.

(56) References Cited

OTHER PUBLICATIONS

International Preliminary Reporton Patentability issued by the International Bureau of WIPO in related International Application No. PCT/US2019/020530 dated Sep. 8, 2020, 12 pages.
International Preliminary Reporton Patentability issued by the International Bureau of WIPO in related International Application No. PCT/US2018/058193 dated Sep. 8, 2020, 12 pages.
Rembold et al., Object Turning for Barcode Search, Proceedings of the 2000 IEEE/RSJ International Conference on Intelligent Robots and Systems, pp. 1267-1272.
Cipolla et al., Visually guided grasping in unstructured environments, Robotics and Autonomous Systems 19.3-4 (1997): 337-346.
sping in Unstructured Environments, Journal of Robotics and Autonomous Systems (Invited Paper), 20 pages.
Klingbeil et al., Grasping with Application to an Autonomous Checkout Robot, ResearchGate, Conference Paper in Proceedings—IEEE International Conference on Robotics and Automation—Jun. 2011, IEEE Xplore, 9 pages.
Non-Final Office Action issued by the U.S. Patent and Trademark Office in related U.S. Appl. No. 16/001,630 dated Dec. 3, 2019, 31 pages.
International Search Report & Written Opinion issued by International Searching Authority in related International Patent Application No. PCT/US2018/058193 dated Feb. 13, 2019, 17 pgs.
International Search Report & Written Opinion issued by International Searching Authority in related International Patent Application No. PCT/US2019/020530 dated Jun. 21, 2019, 14 pgs.
Notice on First Office Action and First Office Action (along with its English translation) issued by the China National Intellectual Property Administration in related Chinese Patent Application No. 201880090771.0 dated May 24, 2021, 26 pages.
Notice on First Office Action and First Office Action (along with its English translation) issued by the China National Intellectual Property Administration in related Chinese Patent Application No. 201980017008.X dated May 31, 2021, 15 pages.
Examiner's Report issued by the Innovation, Science and Economic Development Canada Canadian Intellectual Property Office in related Canadian Patent Application No. 3,090,647 dated Sep. 22, 2021, 4 pages.
Examiner's Report issued by the Innovation, Science and Economic Development Canada Canadian Intellectual Property Office in related Canadian Patent Application No. 3,090,819 dated Sep. 22, 2021, 3 pages.

* cited by examiner

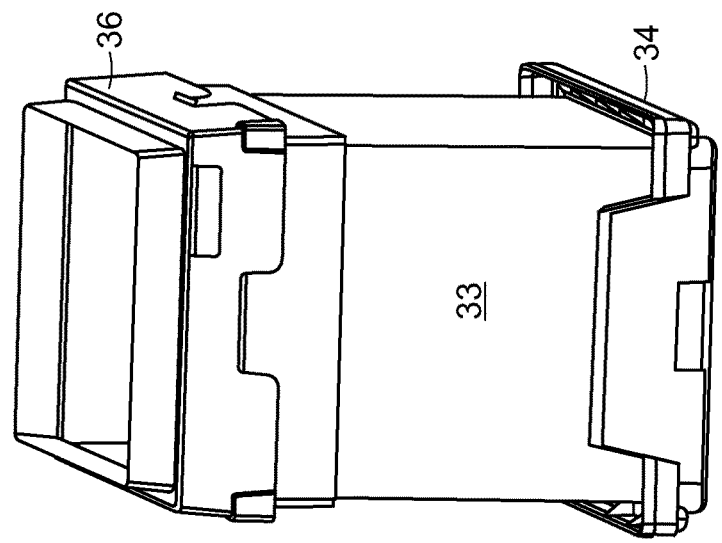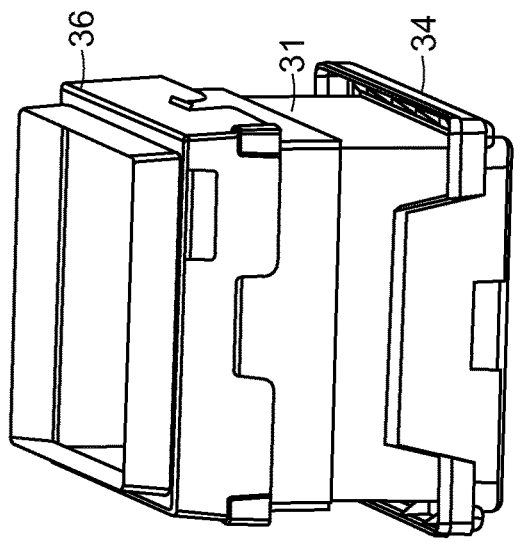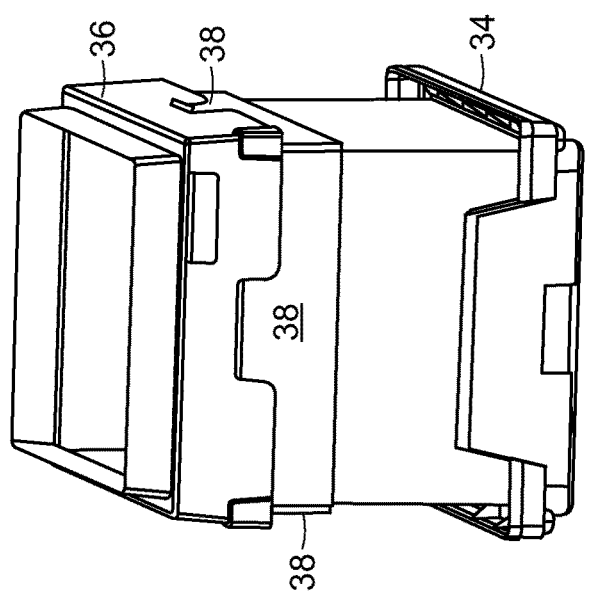

SYSTEMS AND METHODS FOR DYNAMIC PROCESSING OF OBJECTS USING BOX TRAY ASSEMBLIES

PRIORITY

The present application claims priority to U.S. Provisional Patent Application Ser. No. 62/638,724 filed Mar. 5, 2018, the disclosure of which is hereby incorporated by reference in its entirety.

BACKGROUND

The invention generally relates to automated sortation and other processing systems, and relates in certain embodiments to programmable motion control, e.g., robotic, systems for processing, e.g., sorting, objects such as parcels, packages, articles, goods etc.

Current distribution center sorting systems, for example, generally assume an inflexible sequence of operations whereby a disorganized stream of input objects is first singulated by human workers into a single stream of isolated objects presented one at a time to a human worker with a scanner that identifies the object. The objects are then loaded onto one or more conveyors that lead to diverters, and the conveyor(s) then transport the objects to the desired destinations, which may be bins, chutes, bags or destination conveyors.

Such a system has inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects in unison is not always most efficient.

Current state of the art sortation systems rely on human labor. Most solutions rely on a worker that is performing sortation, by scanning an object from an induction area (chute, table, etc.) and placing the object in a staging location, or collection bin. When a bin is full or the controlling software system decides that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Partially automated means of solving this problem are lacking in key areas. Such approaches typically involve tilt-tray or bomb-bay style recirculating conveyors. These conveyors have discrete trays that can be loaded with an object. The trays and objects then pass through scan tunnels that scan the object and associate it with the tray in which it is riding; when the tray passes the correct bin, a trigger mechanism causes the tray to dump the object into the bin. A drawback of such systems is that every divert requires an actuator, which increases the mechanical complexity and the cost per divert can be very high. For applications requiring hundreds of diverts, the large cost of such a system does not achieve a good return on investment.

An alternative is to use human labor to increase the number of diverts, or collection bins, available in the system. This decreases system installation costs, but increases the operating costs. Manual sortation cells are staffed by a team of workers, which avoids the large cost per divert. Multiple cells can then work in parallel, effectively multiplying throughput linearly while keeping the number of expensive automated diverts at a minimum (equal to the number of parallel sortation cells, not the total number of system bins needed). This approach involves objects for sortation being supplied to each cell, which can be done manually but is easily done via means of a conveyor with sweep arms or other dumb diverts to each work cell. Such diverts do not identify an object and cannot divert it to a particular spot; rather they work with beam breaks or other simple sensors to seek to make sure that indiscriminate bunches of objects get diverted to each cell. The lower cost of the unsophisticated diverts coupled with the low number of diverts keeps the overall system divert cost low.

Unfortunately however, these systems don't address the limitations of total number of system bins. The system is simply diverting an equal share of the total objects to each parallel manual cell. Each parallel sortation cell must therefore have all the same collection bins designations; otherwise an object might be delivered to a cell that does not have a bin to which that object is mapped. There remains a need for a more efficient and more cost effective object sortation system that processes (e.g., sorts) objects into appropriate collection bins, yet is more efficient in operation.

SUMMARY

In accordance with an embodiment, the invention provides a box handling system for use in an object processing system. The box handling system includes a box tray including a recessed area for receiving a box, and the recessed area includes a plurality of floor and edge portions for receiving the box that contains objects to be processed.

In accordance with another embodiment, the invention provides a box handling system for use in an object processing system, wherein the box handling system includes a box tray including a recessed area for receiving a box, the recessed area including a plurality of floor and edge portions for receiving the box that contains objects to be processed. The box handling system also includes identifying indicia on at least one of the box and the box tray, the identifying indicia uniquely identifying the box tray handling system.

In accordance with a further embodiment, the invention provides a box handling system for use in an object processing system, where the box handling system includes a box tray including a recessed area for receiving a box, the recessed area including a plurality of floor and edge portions for receiving a box that contains objects to be processed. The box tray includes outer width and length dimensions that provide that a plurality of such box trays when adjacently aligned provides at least one of a total width and total length of the plurality of such box trays that at least one of the total width or total length the plurality of such box trays provides a defined position of each of the plurality of such box trays within the box handling system.

In accordance with yet a further embodiment, the invention provides a box handling system for use in an object processing system, where the box handling system includes a box tray assembly including a tray for receiving a box, the tray including a recessed area for receiving the box, wherein the recessed area includes a plurality of floor and edge portions for receiving the box, and a box cover for placement over an open box such that outer flaps of the box may be maintained in an open position, and wherein the box cover includes an open top portion that permits access to the box.

BRIEF DESCRIPTION OF THE DRAWINGS

The following description may be further understood with reference to the accompanying drawings in which:

FIGS. 9A-9C show illustrative diagrammatic isometric views of the box tray assembly of FIG. 6 (FIG. 9A) as well as box tray assemblies in accordance with further embodiments of the present invention (FIGS. 9B and 9C);

The drawings are shown for illustrative purposes only.

DETAILED DESCRIPTION

In accordance with various embodiments, the invention provides a box handling system for use in an object processing system. The box handling system includes a box tray including a recessed area for receiving a box. The recessed area includes a plurality of floor and edge portions for receiving the box that contains objects to be processed. In accordance with another embodiment, the box handling system includes a box tray including a recessed area for receiving a box, and the recessed area includes a plurality of floor and edge portions for receiving the box that contains objects to be processed. The box handling system also includes identifying indicia on at least one of the box tray and the box, and the identifying indicia uniquely identifies the box tray. In accordance with another embodiment, the box tray also includes outer width and length dimensions that provide that a plurality of such box trays when adjacently aligned provides at least one of a total width and total length of the plurality of such box trays that at least one of the total width or total length the plurality of such box trays provides a defined position and location of each of the plurality of such box trays within the box handling system. In accordance with a further embodiment, the box tray also includes a box cover for placement over an open box such that outer flaps of the box may be maintained in an open position, and wherein the box cover includes an open top portion that permits access to the box.

Figure 1:
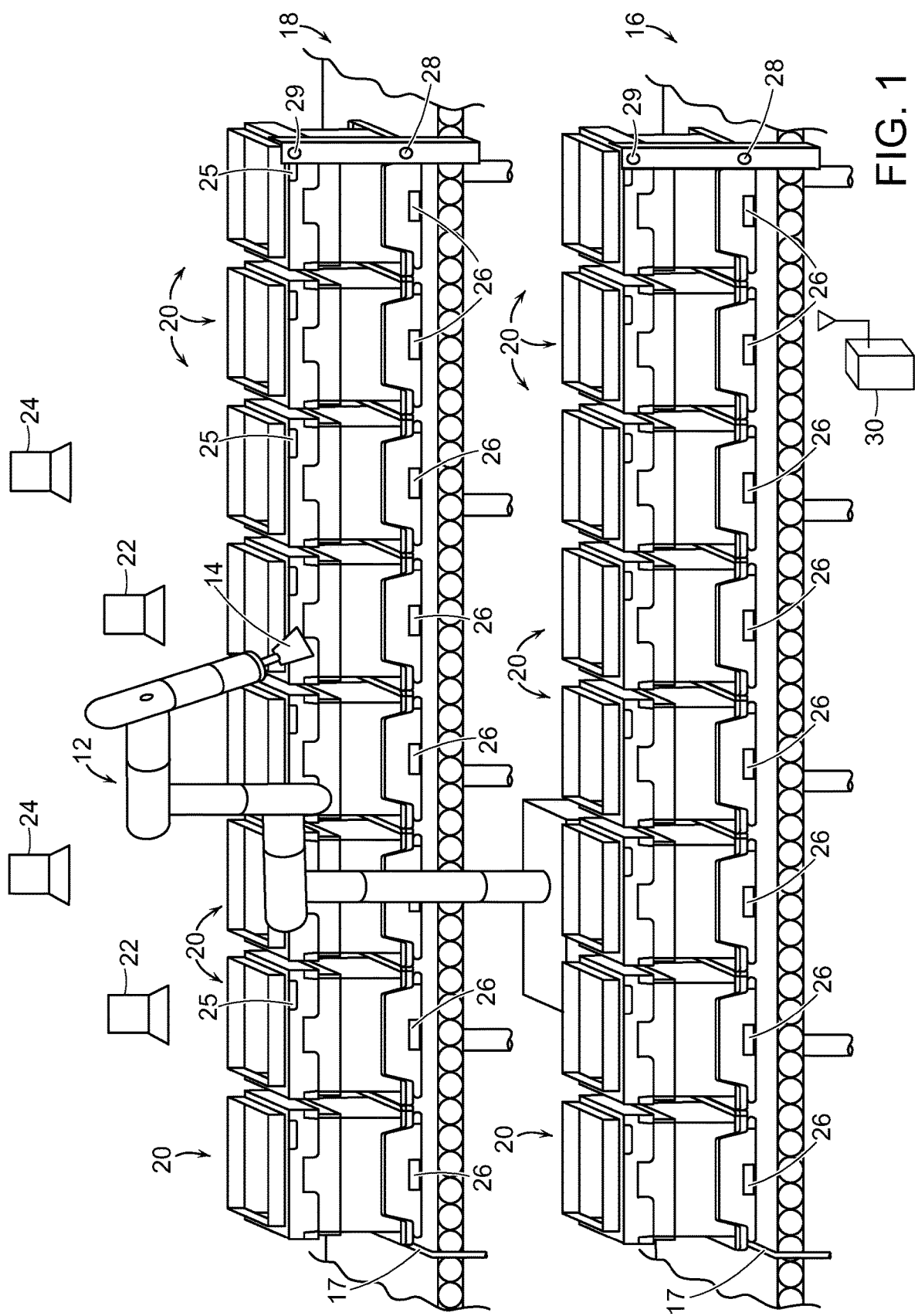
FIG. 1 shows an illustrative diagrammatic isometric view of a box handling system for object processing in accordance with an embodiment of the present invention.

FIG. 1 shows a box handling system 10 for use in object processing in accordance with an embodiment of the present invention. The system 10 includes a programmable motion device 12 such as a robotic system having an end effector 14 (e.g., a vacuum gripper or gripping actuators), that is positioned between two conveyors 16, 18, on which are provided boxes placed on box tray assemblies 20. The system 10 also includes two sets of overhead image collection units 22, 24 for obtaining image data regarding the contents of boxes of the box tray assemblies 20 of the two conveyors 16, 18. Each of the box tray assemblies 20 also includes identifying indicia 26 on box trays as well as identifying indicia 25 on box covers. In further embodiments, the box itself may include identifying indicia 27 as discussed in more detail below with reference to FIG. 2. The system 10 may include perception units 28 and 29 for perceiving perception data (e.g., image data or scan data) regarding the identifying indicia 25, 26 as each box tray assembly 20 passes a perception unit 28, 29. The system may record the identifying indicia for each corresponding box tray and box cover combination, providing robust information regarding each box tray assembly. Generally, as each box tray assembly passes the perception units 28, 29, both indicia 25, 26 are read, and checked for confirmation that the detected box cover corresponds to the detected box tray. In other embodiments, the detected box cover and the detected box tray are now assigned to correspond to each other for the duration of the processing of the box held by the box tray and the box cover.

Responsive to such box assignment by the perception data, a processing system 30 directs the programmable motion device to move contents in box tray assemblies on one conveyor to box tray assemblies 20 on the other conveyor. Any number of programmable motion devices 12 may be provided between adjacent rows of box tray assemblies 20 for further scaling the automated processing. In an embodiment, the system knows what is in boxes associated with each identifying indicia (e.g., 26), and the system knows which items are to be moved from one conveyor 16 to box tray assemblies on another conveyor 18. Because each of the box tray assemblies is provided known distances from stops 17, the system knows where each box is positioned on conveyors 16, 18 because each of the box trays has the same known width, and because the box tray assemblies are urged toward to the stop, either by a gravity fed conveyor or by having the conveyor continue to urge the box tray assemblies in the direction toward the stop 17.

Figure 2:
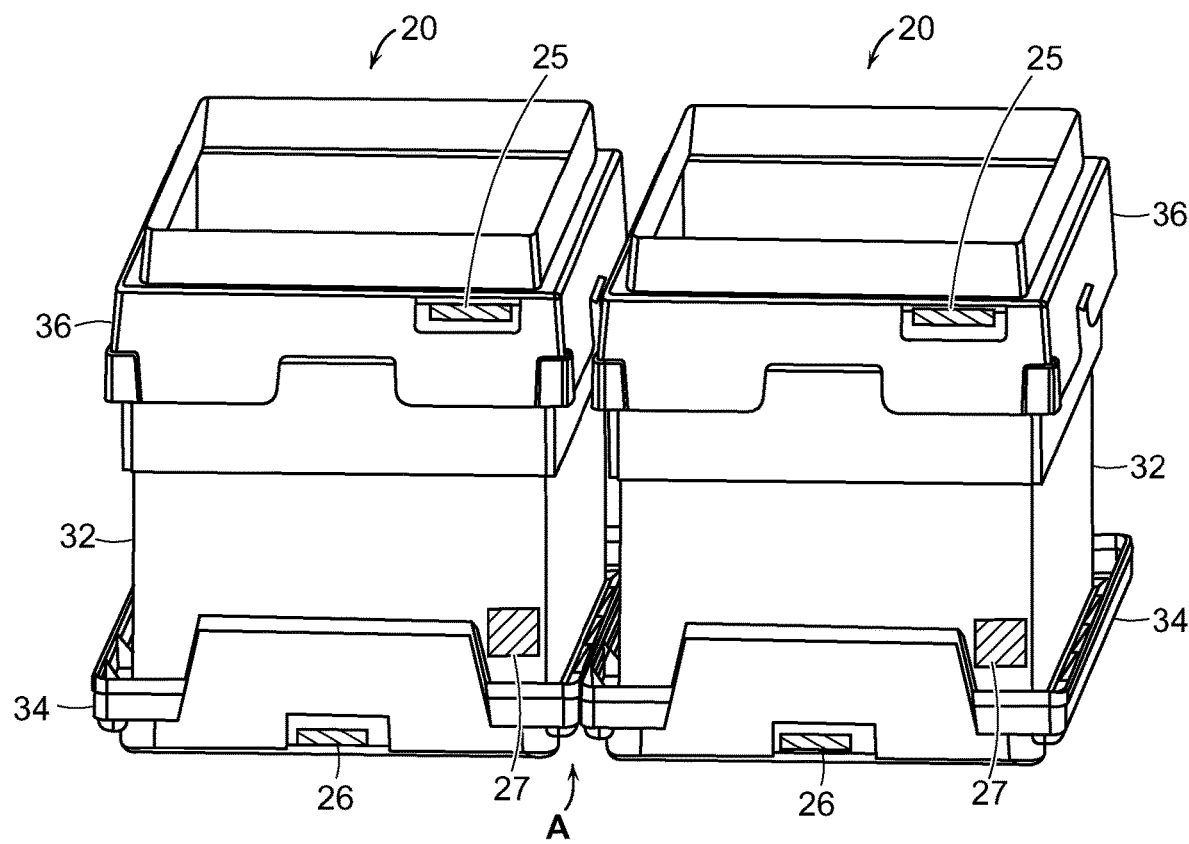
FIG. 2 shows an illustrative diagrammatic isometric view of two box trays of the box handling system of FIG. 1.
Figure 3:
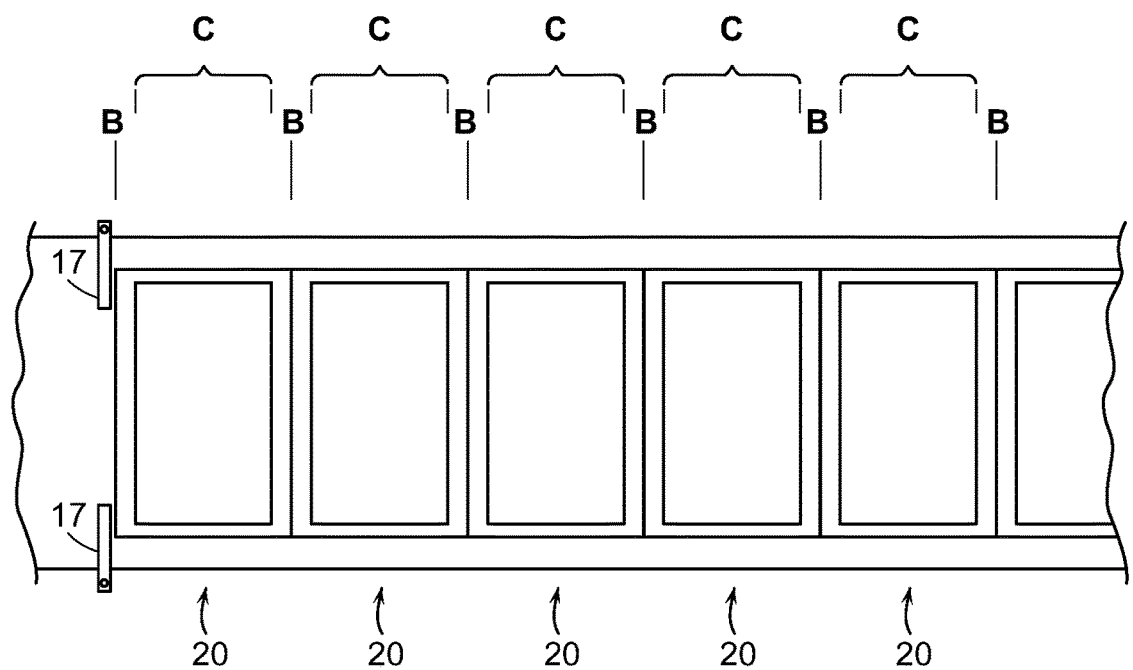
FIG. 3 shows an illustrative diagrammatic plan view of multiple box trays of the box handling system of FIG. 1.

With further reference to FIG. 2, each box tray assembly 20 may include a box 32 that is received by a box tray 34, and on top of which is placed a box cover 36. Again each conveyor 16, 18 may include an actuatable stop 17 for selectively stopping the movement of box tray assemblies along each conveyor. The outer edges of the box trays 34 are designed to abut each other along either their length or width sides (as indicated at A) such that distances between the boxes (as indicated at B) and the locations of the openings of each box tray assembly (as indicated at C) is known as further shown in FIG. 3. As also shown in FIG. 2, either or both the box cover 36 or the box tray 34 or the box 32 may include the identifying indicia 25, 26, 27. During processing therefore, as box tray assemblies 20 pass in front of perception units 28, 29, 31, the processing system 30 records the identity of each successive box tray assembly, box and box cover. Because the box tray assemblies are of equal width (or length if aligned lengthwise) and because the position of the stop 17 is known, the locations of each of the box tray assemblies is known, as is the location (and identity) of the contents within each box.

This provides the system 10 with significant uniformity that greatly assists in the automated processing of the objects. The stops 17 may be actuated for a limited time for processing of objects thus contained near a programmable motion device 12, and then released to permit the box tray assemblies 20 to pass, and to permit a new set of box tray assemblies (and associated new objects) and or a new set of destination box tray assemblies to be presented near the programmable motion device. As also shown in FIG. 2, the indicia 26 may be provided on the box tray in a recessed area 46 that protects the indicia 26 from damage or peeling from abrasion or other contact with other moving or non-moving structures, and may provide a convenient handle for a person to use to grasp the box tray (particularly when another similar recessed area is provided on the opposite side of the box tray). Similarly the indicia 25 may be provided on the box cover 36 in a recessed area 45 that protects the indicia 25 from damage or peeling from abrasion or other contact with other moving or non-moving structures.

Figure 4:
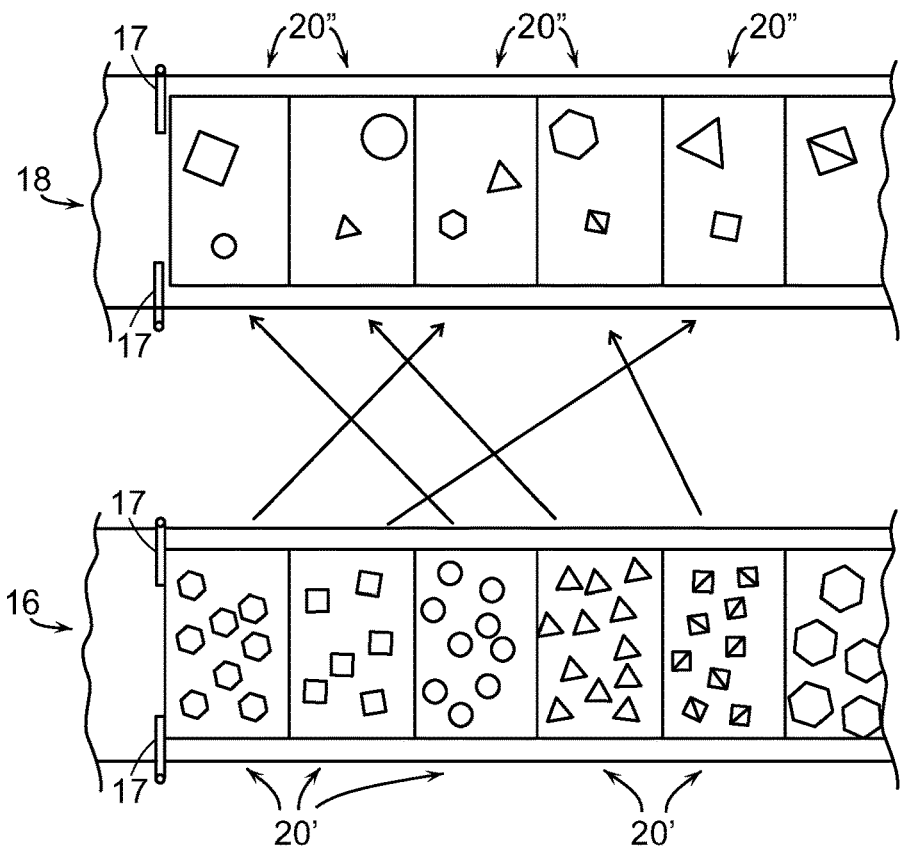
FIG. 4 shows an illustrative diagrammatic plan view of object processing homogenous objects to heterogeneous objects using the box handling system of FIG. 1.
Figure 5:
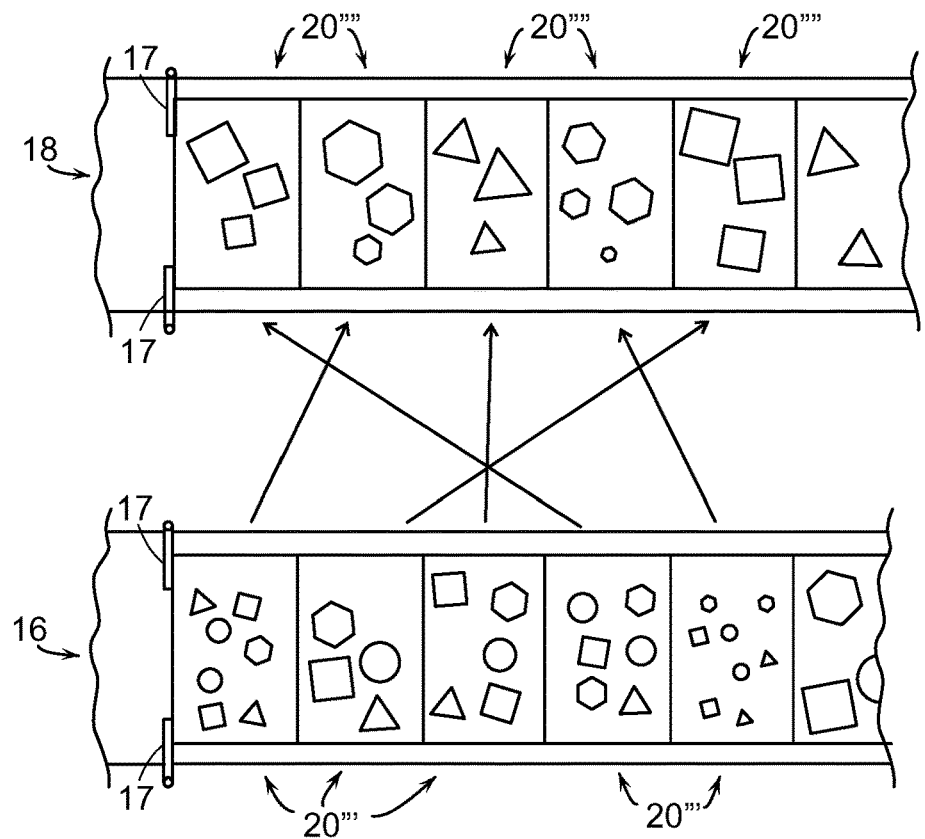
FIG. 5 shows an illustrative diagrammatic plan view of object processing heterogeneous objects to homogenous objects using the box handling system of FIG. 1.

FIG. 4 for example, shows the processing of objects from box tray assemblies 20' in which the contents of each box are homogenous, to box tray assemblies 20" in which the contents of each box are heterogeneous. FIG. 5 shows the processing of objects from box tray assemblies 20''' in which the contents of each box are heterogeneous, to box tray assemblies 20'''' in which the contents of each box are homogeneous in some regard. Such object processing may provide traditional sortation into like products, or may be used to produce collections or objects, for example, either destined for a common shipping location, or that are selected to provide a breakpack to be delivered to a location for breaking apart in a particular, predefined way (such as providing items for a common isle at a retail store).

Figure 6:
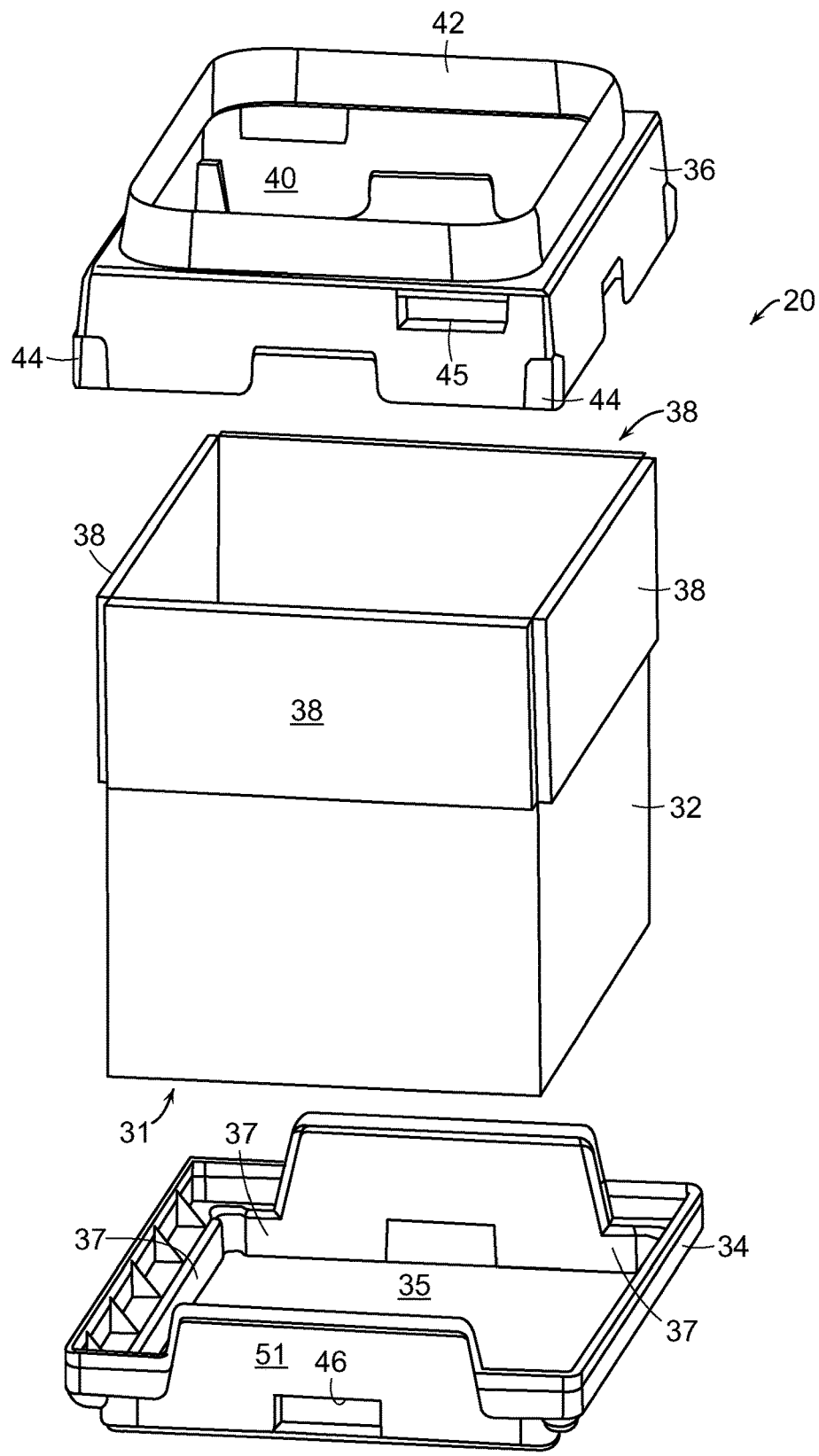
FIG. 6 shows an illustrative diagrammatic exploded view of a box tray assembly, box and box cover of the box handling system of FIG. 1.
Figure 7:
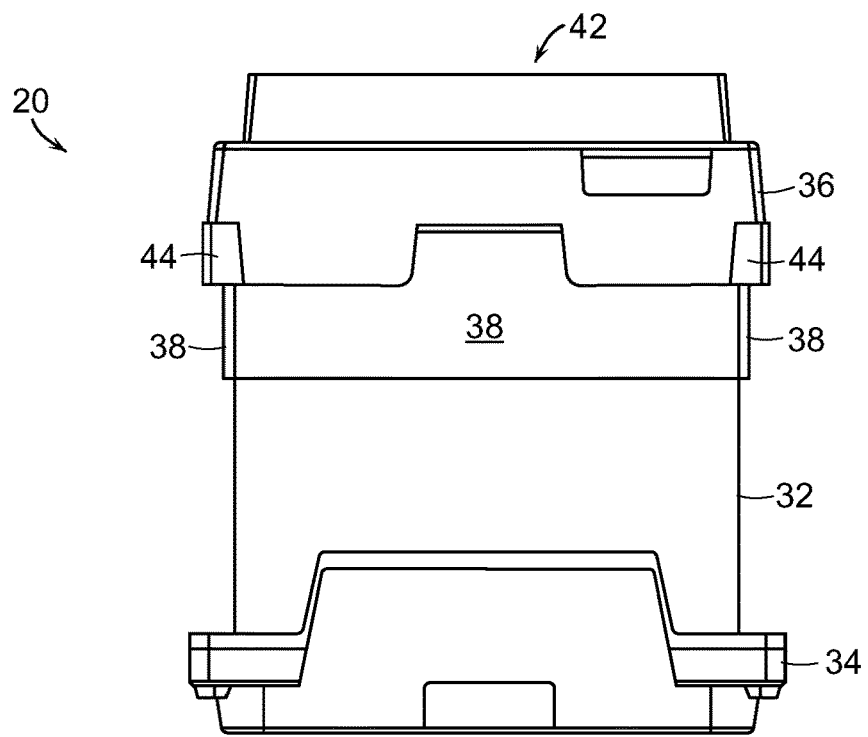
FIG. 7 shows an illustrative diagrammatic end view of the box tray assembly of FIG. 6.
Figure 8:
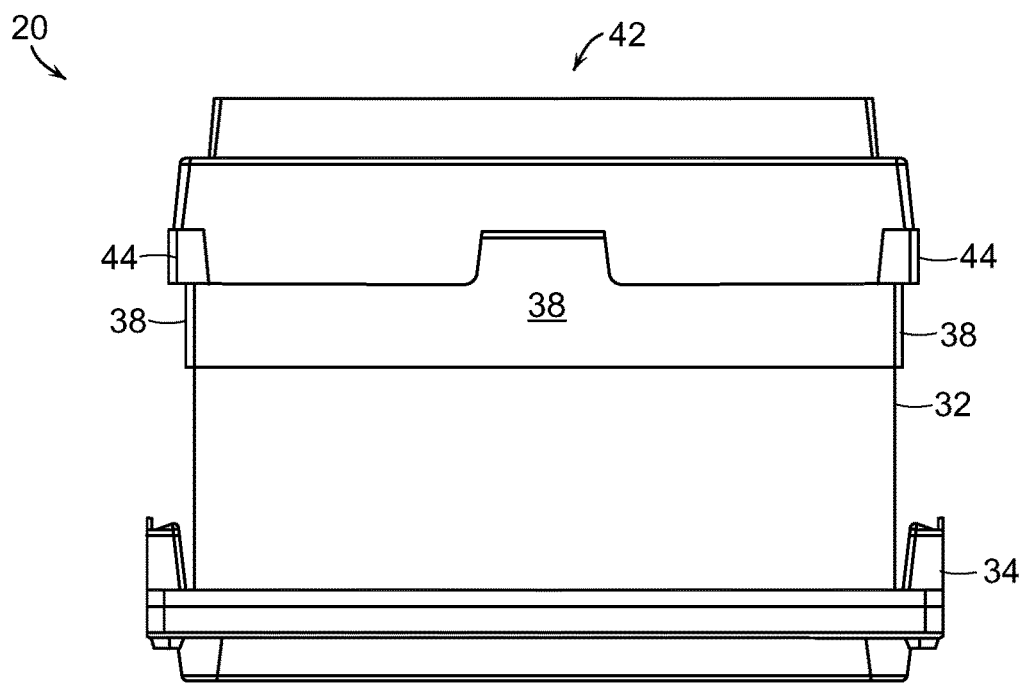
FIG. 8 shows an illustrative diagrammatic side view of the box tray assembly of FIG. 6.

FIG. 6 shows an exploded view of the box tray assembly 20. As shown, the box 32 (e.g., a standard shipping sized cardboard box) may include bottom and side edges 31, 33 that are received by a top surface 35 and inner sides 37 of the box tray 34. As also shown in FIG. 6, the box 30 may include top flaps 38 that, when opened as shown, are held open by inner surfaces 40 of the box cover 36. The box cover 36 may also a defined rim opening 42, as well as corner elements 44. The box 32 is thus maintained securely within the box tray 34, and the box cover 36 provides that the flaps 38 remain down along the outside of the box permitting the interior of the box to be accessible through the opening 42 in the box cover 36. The recessed area 45 of the box cover 36 may include the identifying indicia, and the recessed area 46 of the box tray 34 may also include identifying indicia as discussed above. FIG. 7 shows a width side view (and FIG. 8 shows a length side view) of the box tray assembly 20 with the box 32 securely seated within the box tray 34, and the box cover holding open the flaps 38 of the box 32.

Figure 10B:
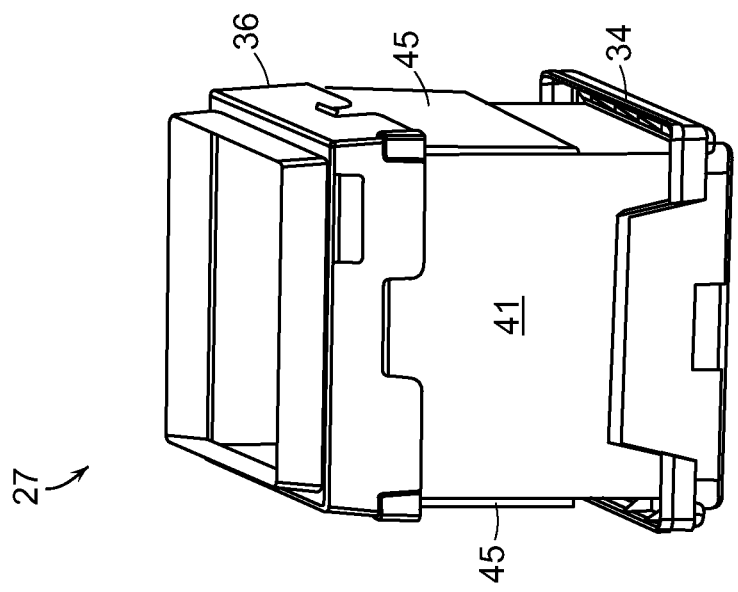
FIGS. 10A and 10B show illustrative diagrammatic isometric views of box tray assemblies in accordance with further embodiments of the invention involving boxes with a variety of flap arrangements.
Figure 10A:
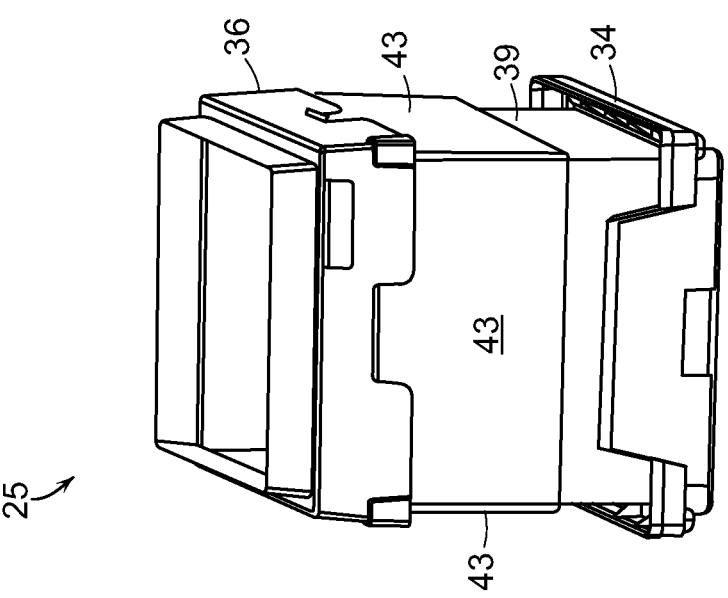

FIG. 9A shows an isometric view of the box tray assembly 20, with the box 32 resting in the box tray 34, and with the box top 36 holding the flaps 38 of the box open. With reference to FIGS. 9B and 9C, the same box trays 34 and box covers 36 may be used with different height boxes 32' and 32", thereby permitting the box trays 34 and box covers 36 to be used on a wide variety of boxes. Similarly, and with reference to FIGS. 10A and 10B, the same box trays 34 and box covers 36 may be used on boxes 39, 41 that have different sized box flaps 43, and even fewer than four flaps 45 (e.g., one or two flaps) as shown. Additionally, the contents of the box may extend above the box cover, in the event that the contents may later settle, enabling the box to be later closed, and in particular, the sides of the cover may help support contents of the box above the box opening.

Figure 11:
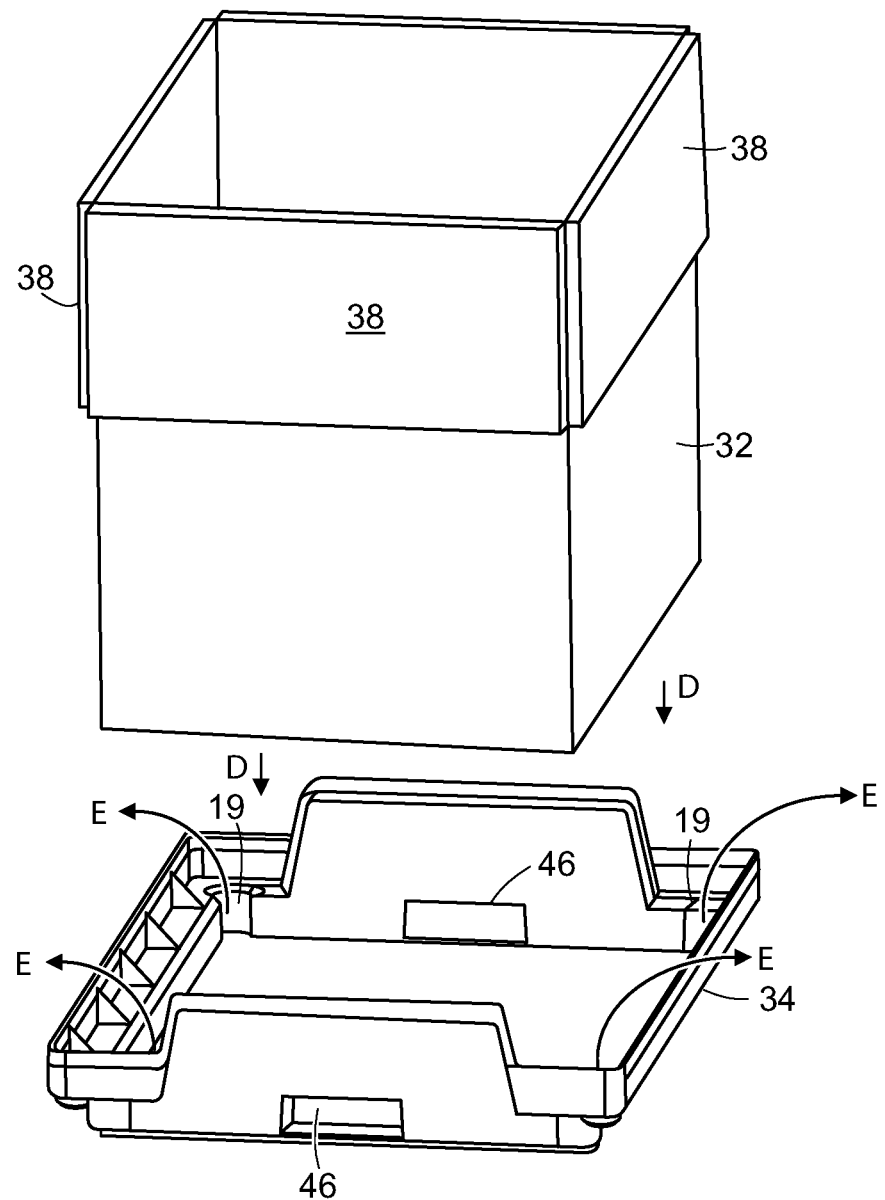
FIG. 11 shows an illustrative diagrammatic view of the box and box tray of FIG. 6 showing air egress when a box is positioned in the box tray.
Figure 15:
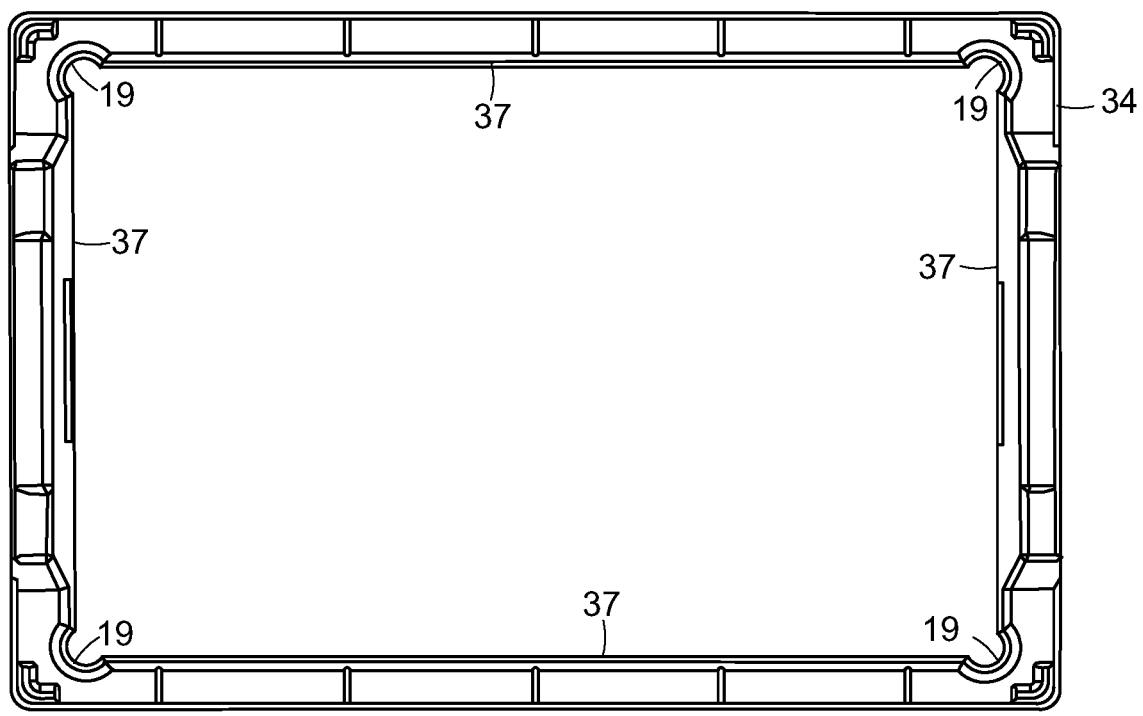
FIG. 15 shows an illustrative diagrammatic top view of the box tray of FIG. 12.

FIG. 11 shows the box 32 being lowered in a direction as shown at D into the box tray 34. As shown at E in FIG. 11, when the box 32 is close to the base of the box tray 34, air is able to escape through corner openings 19 (which are also shown in FIG. 15). By the use of such openings, the size of the box (length and width, not height) may be snug fit to the interior of the box tray. In accordance with further embodiments, the box trays may include a lock-in detent feature to secure the box to the box tray, such as for example, having one or more sides 37 move inward to engage a box side. The use of such box trays to convey a box may be particularly beneficial when using conveyors that cannot readily convey an empty box alone due to the light weight of the empty box. If, for example, a roller conveyor is used, the rollers may rotate under an empty box without actually moving the box in the desired direction. The box tray has (somewhat) more mass than that of an empty box, and will ensure that the box tray will be readily conveyable by the conveyance system. The features on the bottom of the box tray also facilitate this as discussed in more detail below.

Figure 12:
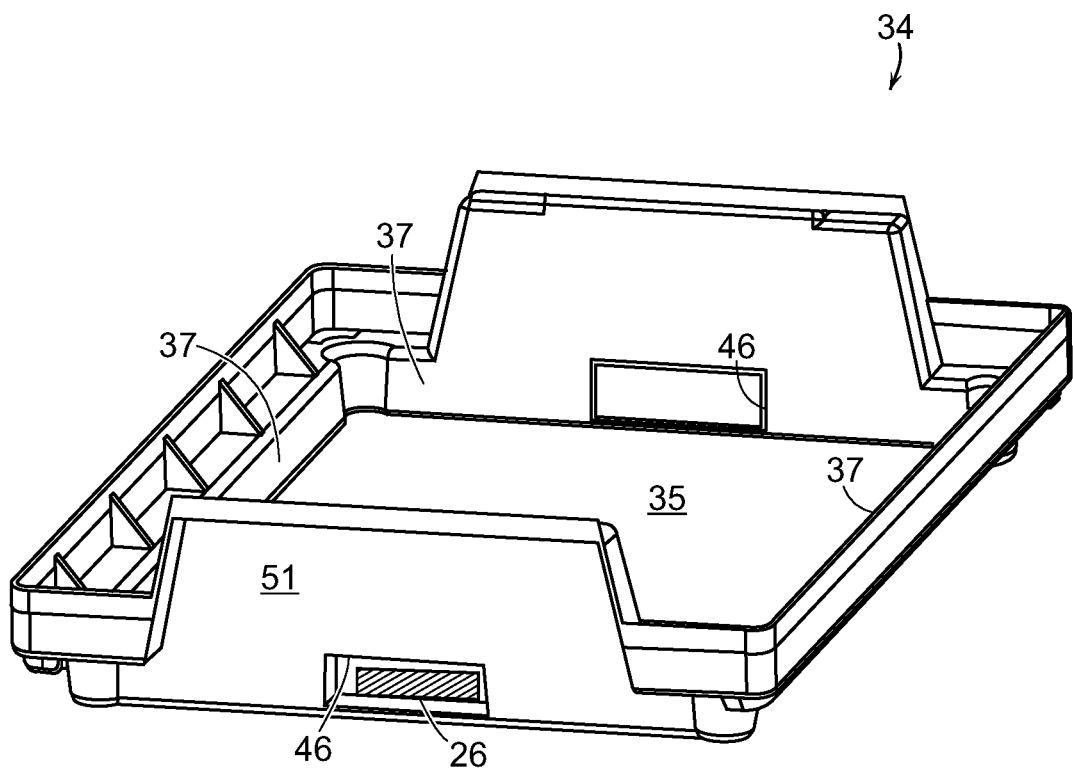
FIG. 12 shows an illustrative diagrammatic isometric view of the box tray of the box tray of FIG. 6 showing indicia provided in a recessed area in accordance with embodiment of the present invention.
Figure 13:
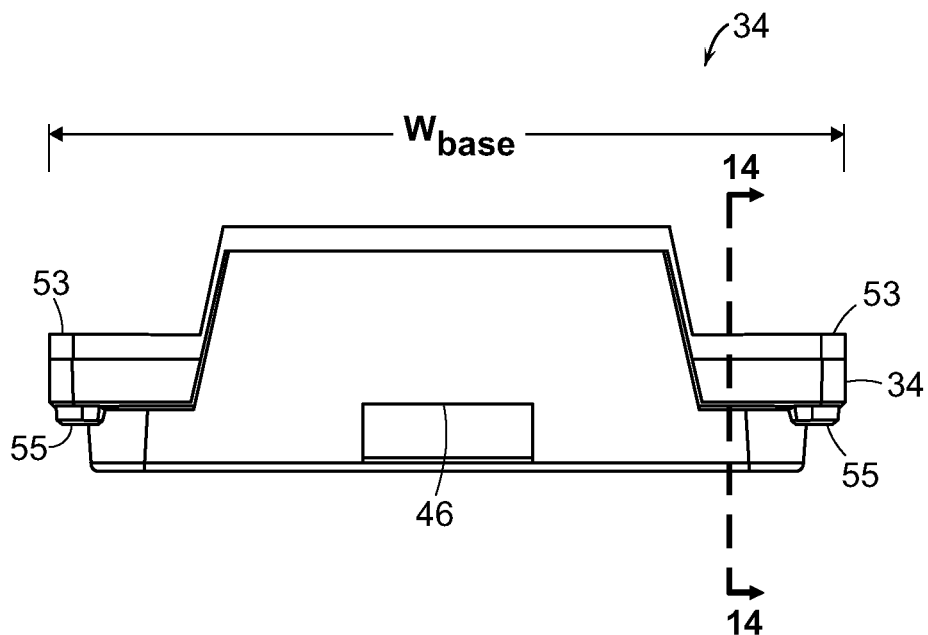
FIG. 13 shows an illustrative diagrammatic end view of the box tray of FIG. 12.
Figure 14:
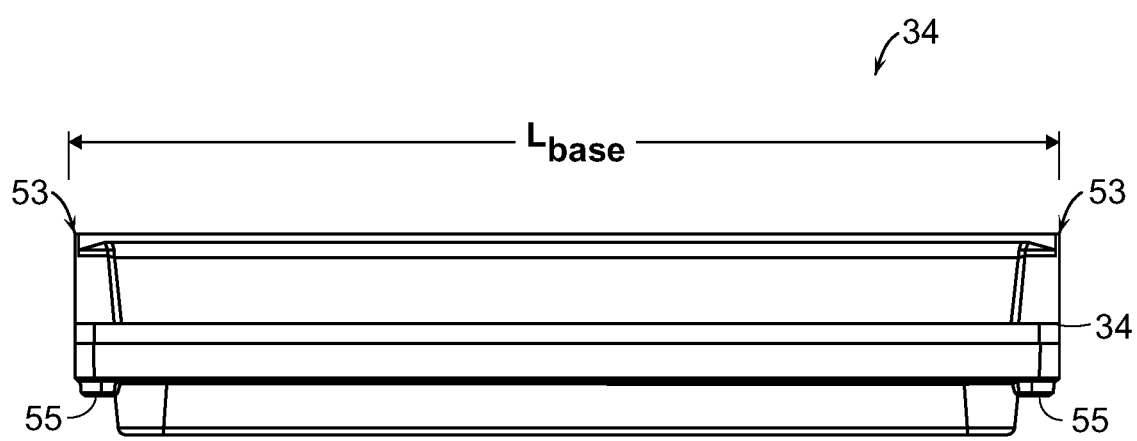
FIG. 14 shows an illustrative diagrammatic side view of the box tray of FIG. 12.
Figure 16:
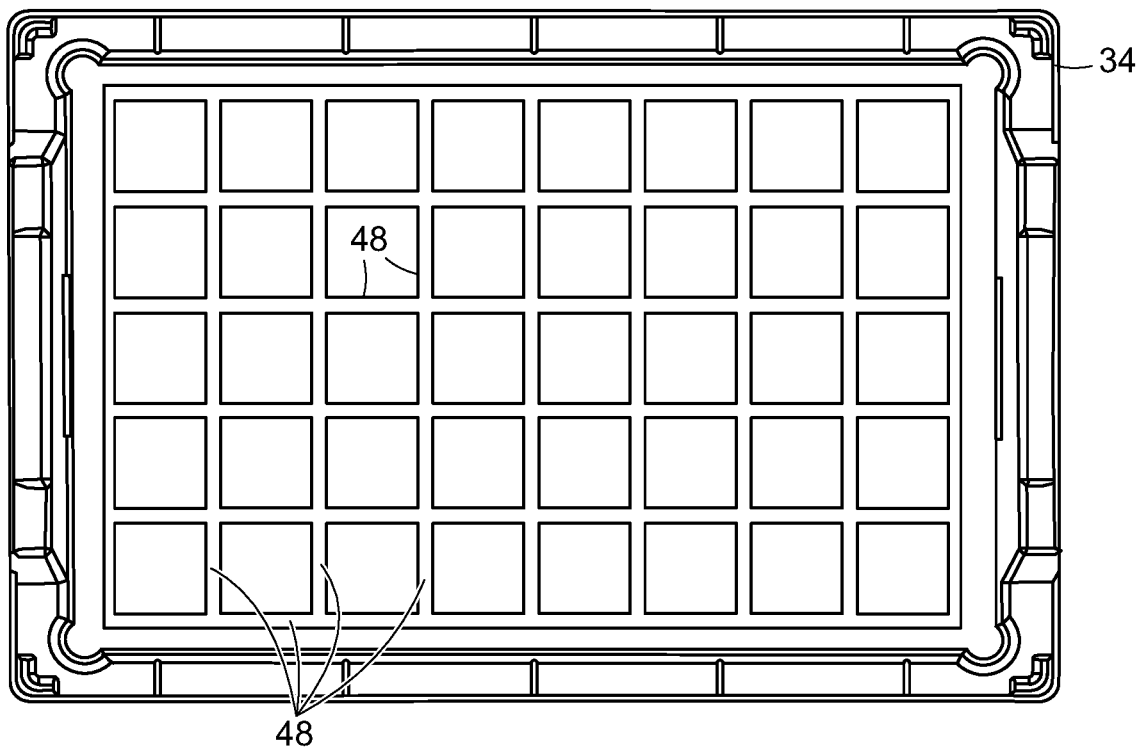
FIG. 16 shows an illustrative diagrammatic bottom view of the box tray of FIG. 12.

FIGS. 12-16 show further views in detail of the box tray 34. In particular, FIG. 12 shows an isometric view of the box tray 34. FIG. 13 shows a width side view of the box tray 34 (having a width $W_{base}$ as shown), and FIG. 14 shows a length side view of the box tray 34 (having a length $L_{base}$ as shown). FIG. 15 shows a top view of the box tray 34, and FIG. 16 shows a bottom view of the box tray 34. The inner sides 37 of the box tray 34 as well as the bottom 35 of the box tray 34 into which the box 32 is received, are further shown in FIGS. 9 and 12. The box tray 34 also includes recesses 46 (as shown in FIGS. 12 and 13) in which indicia may be placed, and optionally, by which the box tray (and any box thereon) may be lifted by a human. The box tray 34 also includes a patterned relief structure 48 on the underside of the box tray 34 as shown in FIG. 16. The structure 48 are also level with the bottom edges of the box tray. The structures 48 ensure that the bottom of the box tray provides sufficient friction for movement on the conveyor, but is also flat enough on the bottom that the box tray may be kicked onto an adjacent conveyor (as discussed in more detail below). FIG. 12 also shows a box kick region 51 of the box tray that may be contacted by an automated box kicker as discussed in more detail below.

Figure 17:
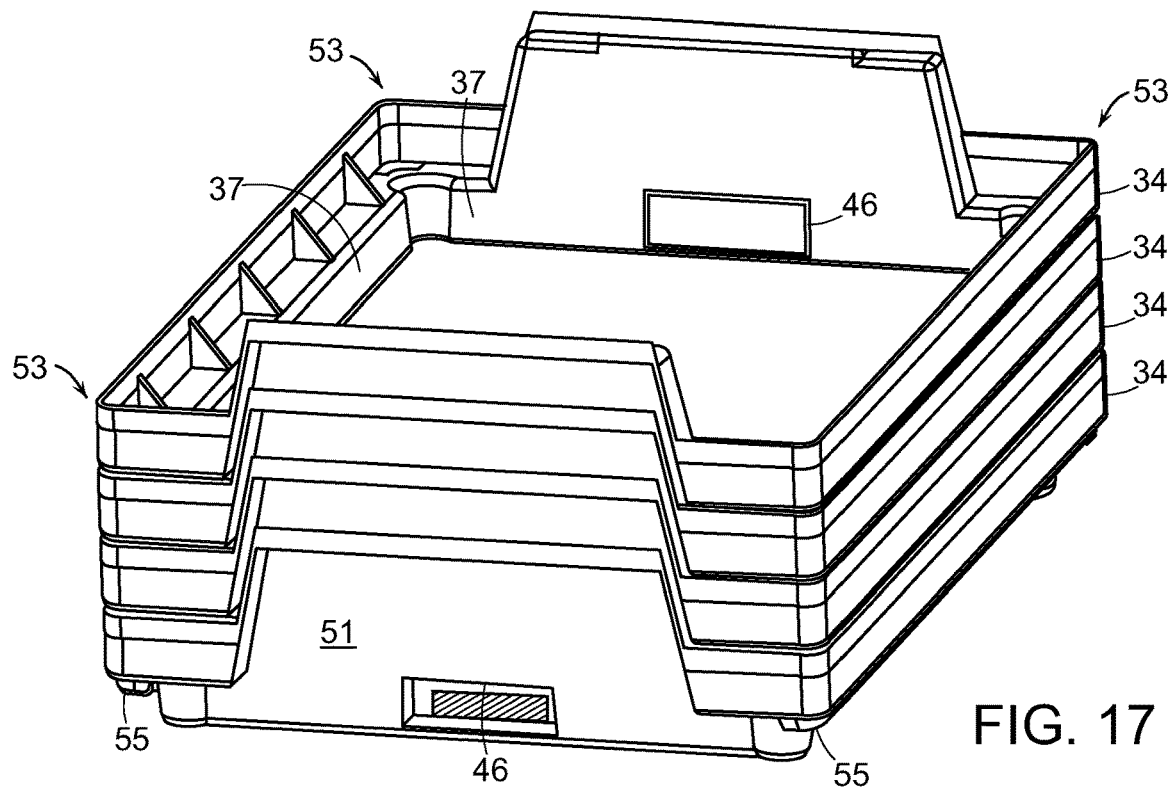
FIG. 17 shows an illustrative diagrammatic isometric view of a plurality of stacked box trays.

FIG. 17 shows multiple box trays 34 stacked onto one another, showing that the box trays may be nested into each other for stacking. In particular, wall corners 53 in a box tray may receive alignment features 55 of an adjacently stacked box tray. Also, the box kick portion 51 may nest inside side walls of adjacent box trays as shown. In this way, a plurality of box trays may be sacked upon each other for easy transport (on conveyors) and storage.

Figure 18:
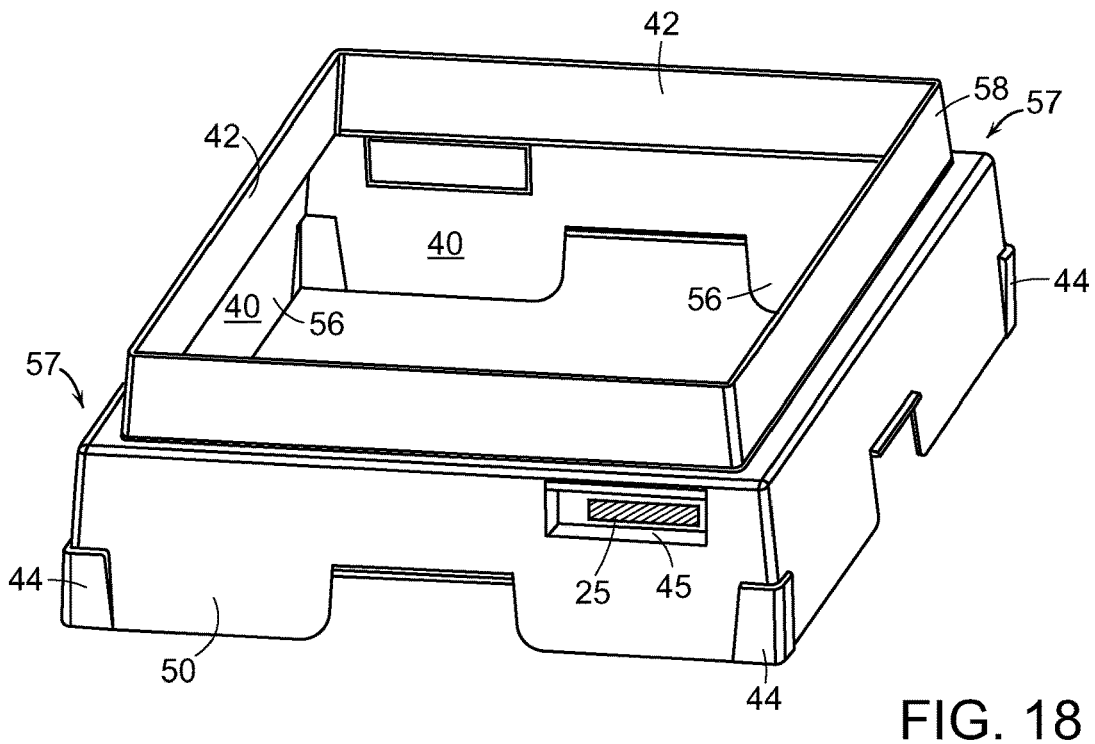
FIG. 18 shows an illustrative diagrammatic isometric view of the box cover of the box tray of FIG. 6 showing indicia provided in a recessed area in accordance with embodiment of the present invention.
Figure 19:
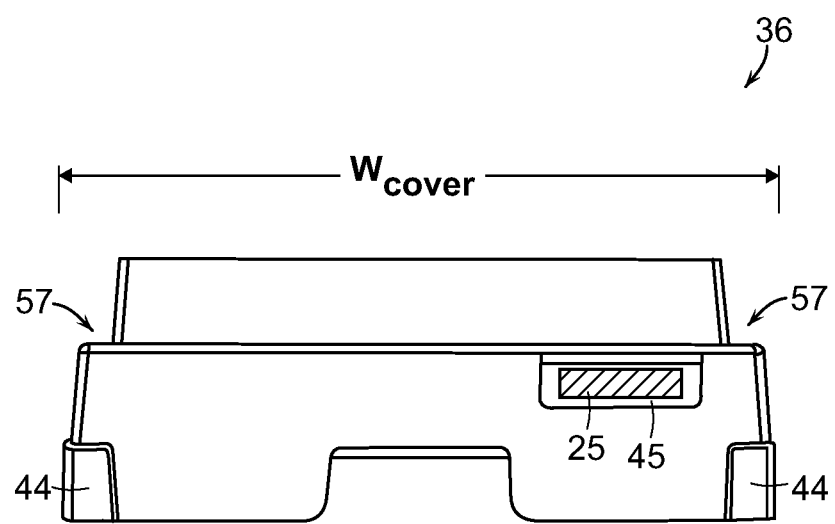
FIG. 19 shows an illustrative diagrammatic end view of the box cover of FIG. 18.
Figure 20:
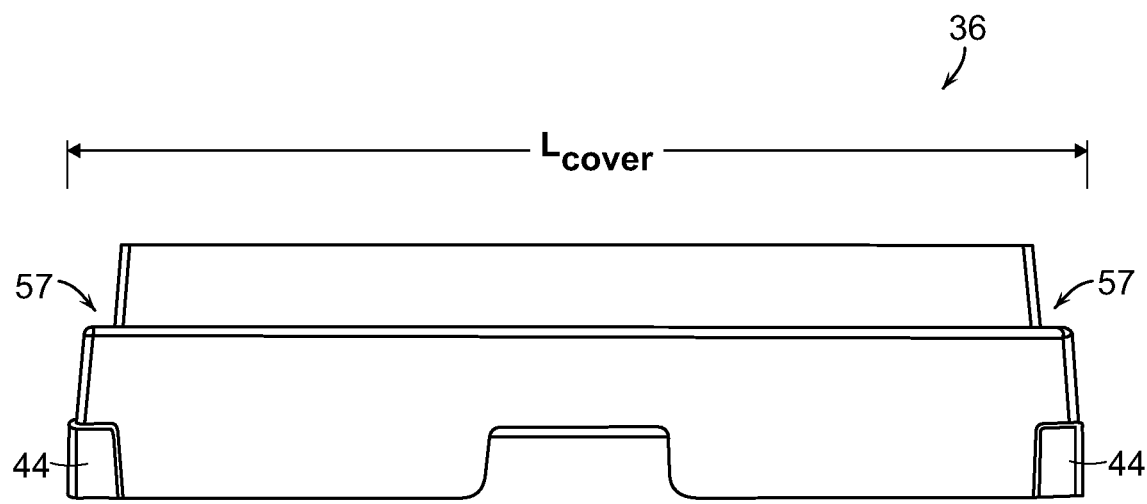
FIG. 20 shows an illustrative diagrammatic side view of the box cover of FIG. 18.

FIGS. 18-22 show further views in detail of the box cover 36. In particular, the box cover 36 includes engaging walls 56 that engage (on the inside thereof) the open flaps of a box top. The box cover 36 also includes opening walls 58 that define an opening for objects to be retrieved from or inserted into the box. The opening walls 58 are mounted on a base that includes shoulder corners 57, which, when multiple box covers are stacked, align with tabs 44 of other adjacent box covers as shown in FIG. 23. FIG. 18 shows an isometric view of the box cover 36. FIG. 19 shows a width side view of the box cover 36 showing the width of the cover ($W_{cover}$), and FIG. 20 shows a length side view of the box cover 36 showing the length of the cover ($L_{cover}$).

Figure 21:
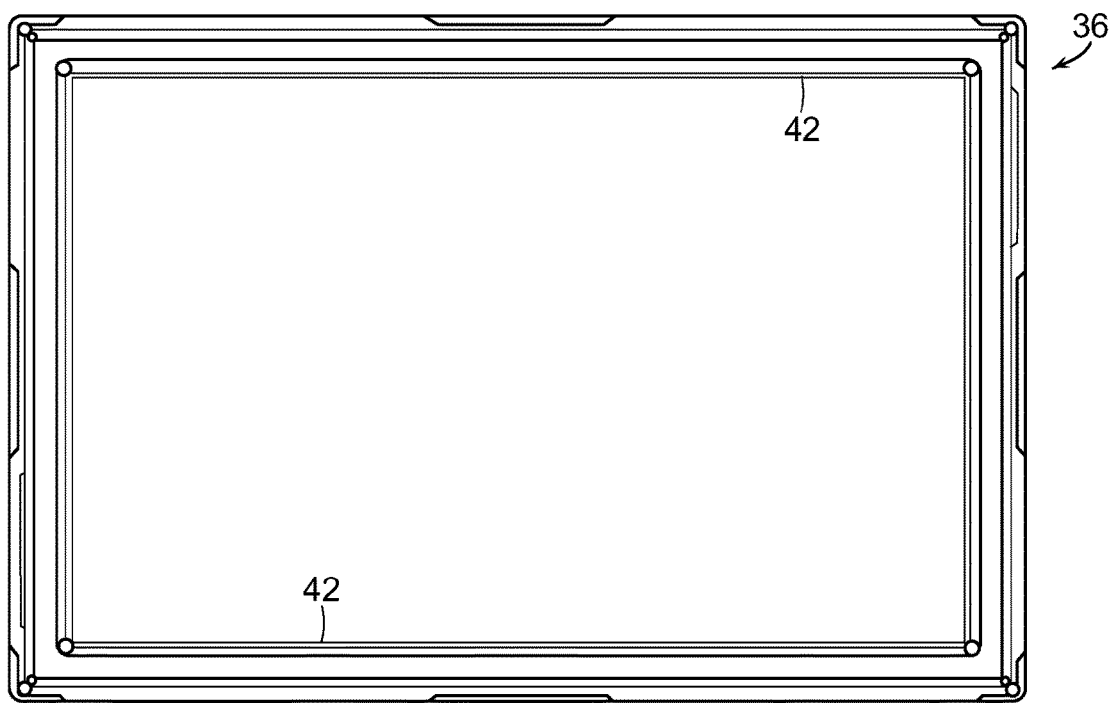
FIG. 21 shows an illustrative diagrammatic top view of the box cover of FIG. 18.
Figure 22:
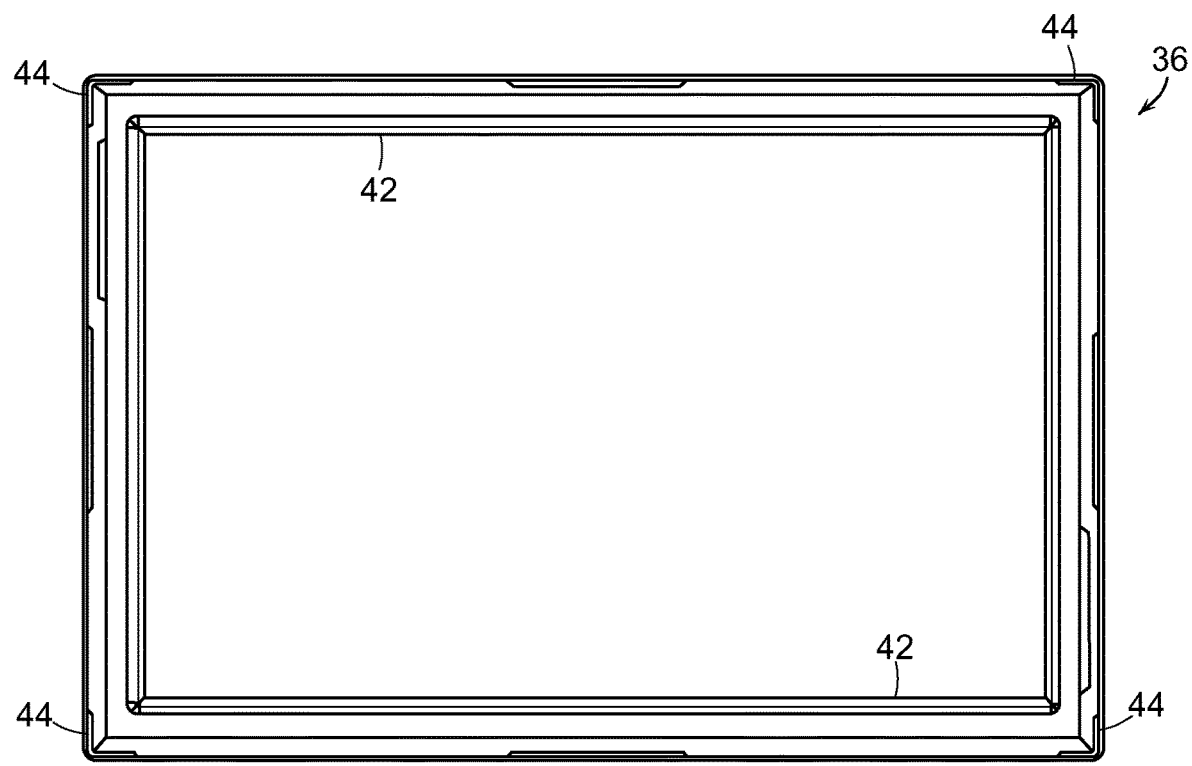
FIG. 22 shows an illustrative diagrammatic bottom view of the cover tray of FIG. 18.
Figure 23:
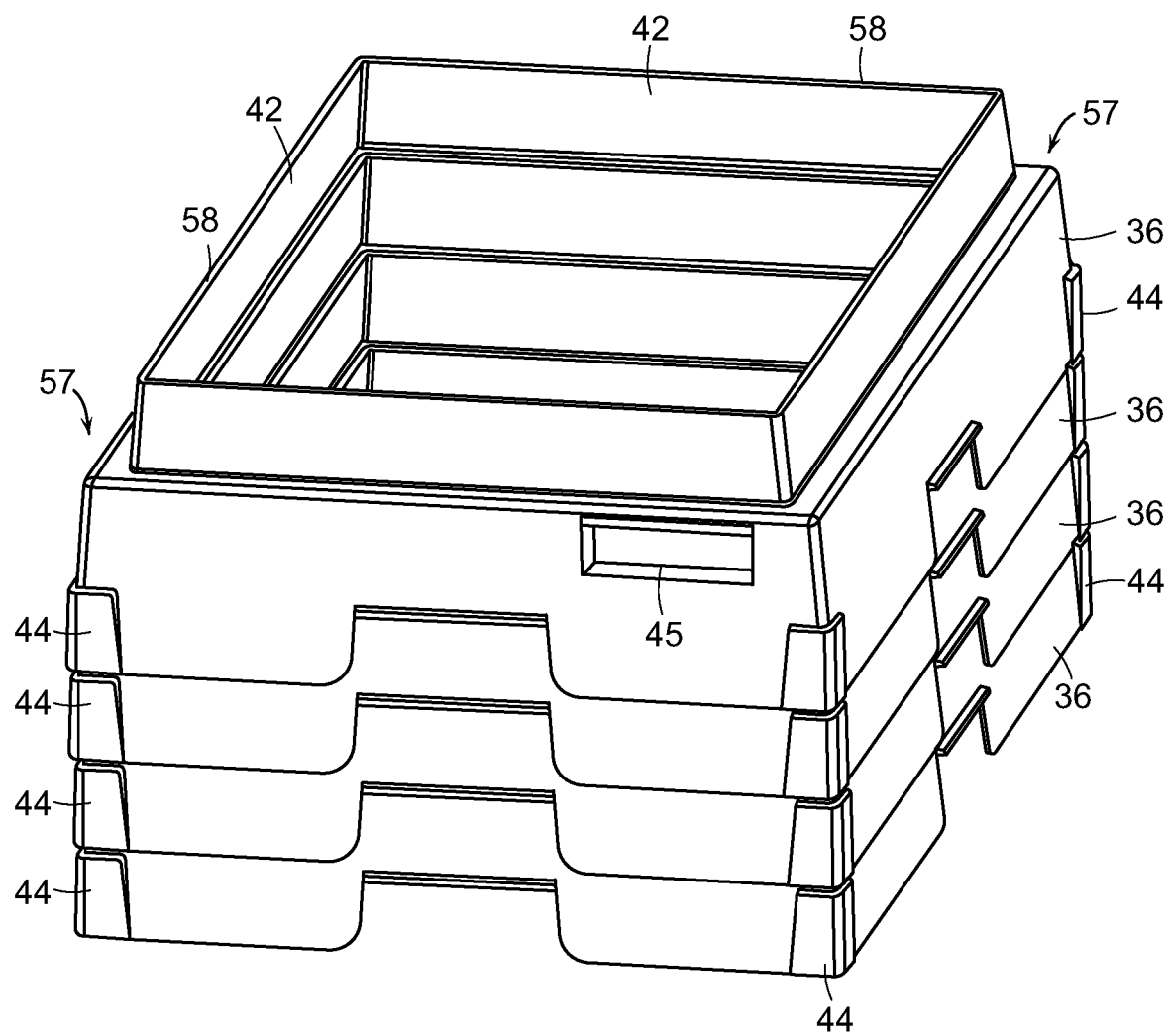
FIG. 23 shows an illustrative diagrammatic isometric view of a plurality of stacked box covers.

FIG. 21 shows a top view of the box cover 36, and FIG. 22 shows a bottom view of the box cover 36. In accordance with an embodiment, the width of the cover ($W_{cover}$) is less than the width of the box tray ($W_{base}$), and the length of the cover ($L_{cover}$) is less than the length of the box tray ($L_{base}$). In other embodiments, the width of the box cover may be the same as the width of the box tray, and the length of the cover may be the same as that of the box tray. In further embodiments, the dimensions of the cover ($W_{cover}$, $L_{cover}$) may be larger than those of the box tray, and the dimensions of the cover may determine the location and position of each of the boxes rather than using the dimensions of the base ($W_{base}$, $L_{base}$). FIG. 23 shows multiple box covers 36 stacked onto one another, showing that the box covers may also be nested into each other for stacking. In particular tabs 44 are shown aligned with shoulder corners 57 of adjacently stacked box covers.

Figure 24A:
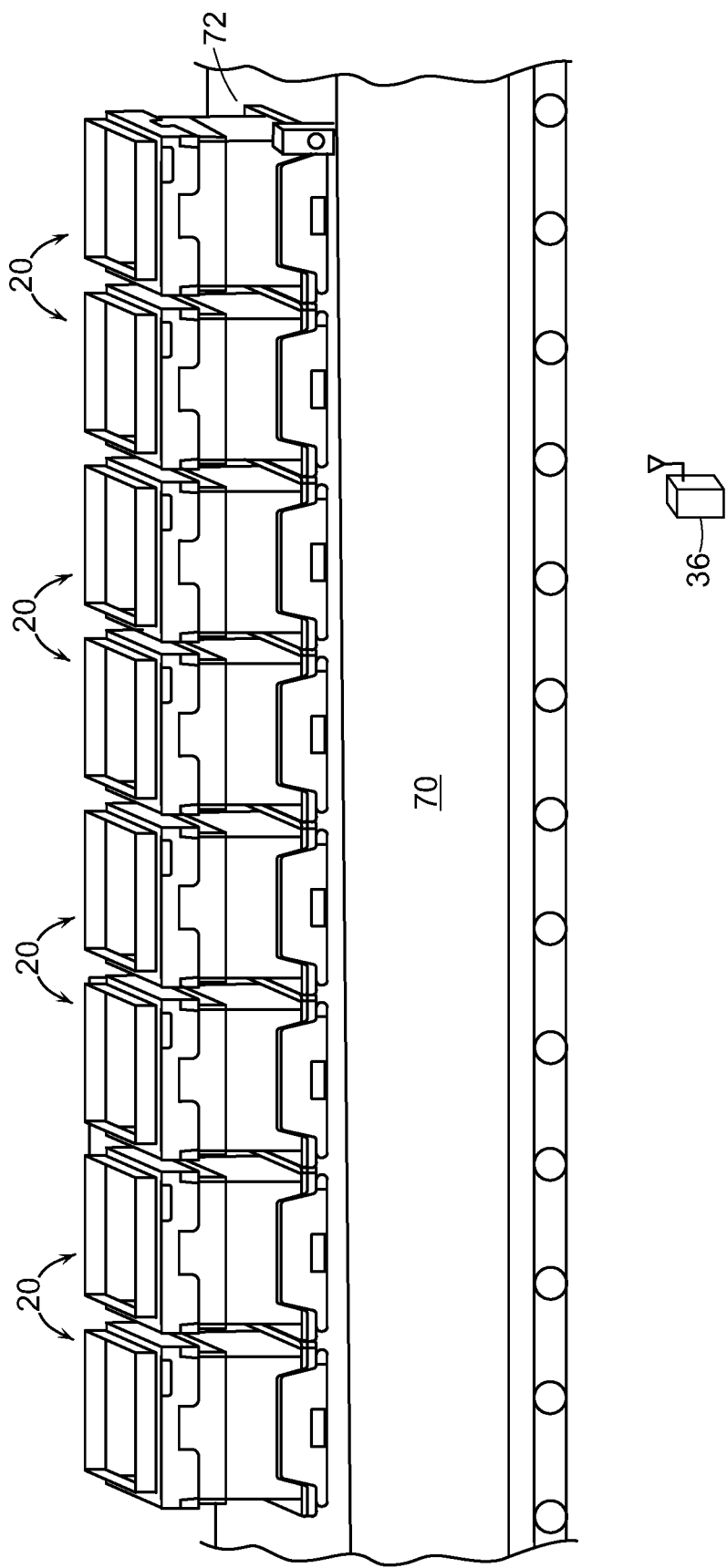
FIGS. 24A-24D show illustrative diagrammatic views of a box tray assembly being transferred from one conveyor to another in accordance with an embodiment of the present invention.
Figure 24B:
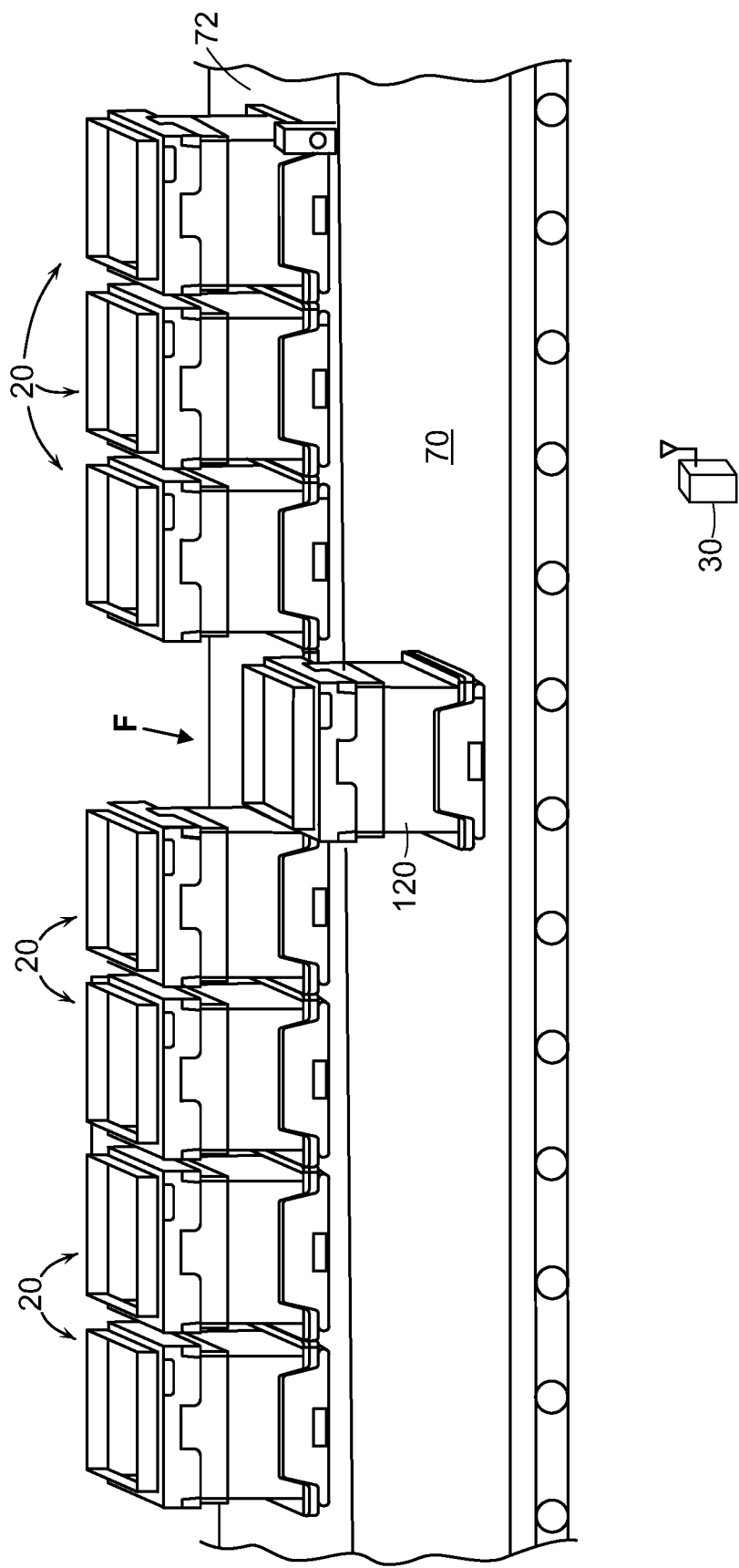
Figure 24C:
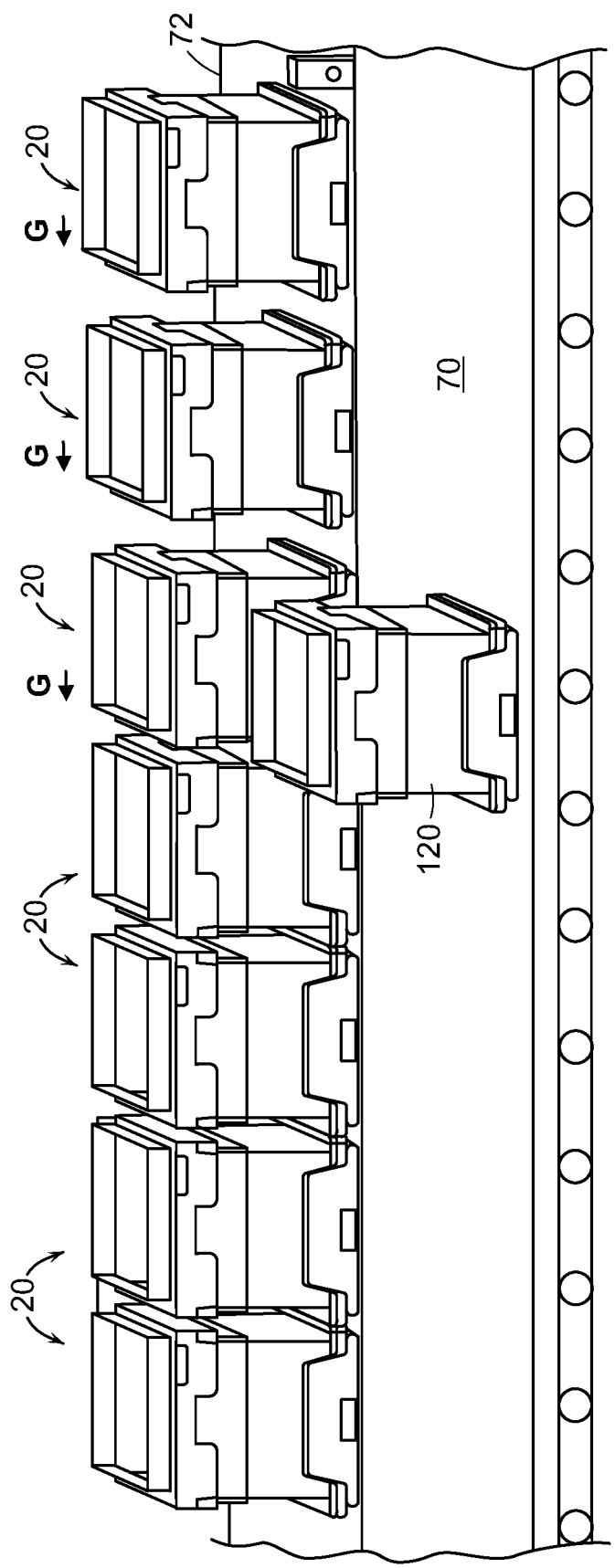
Figure 24D:
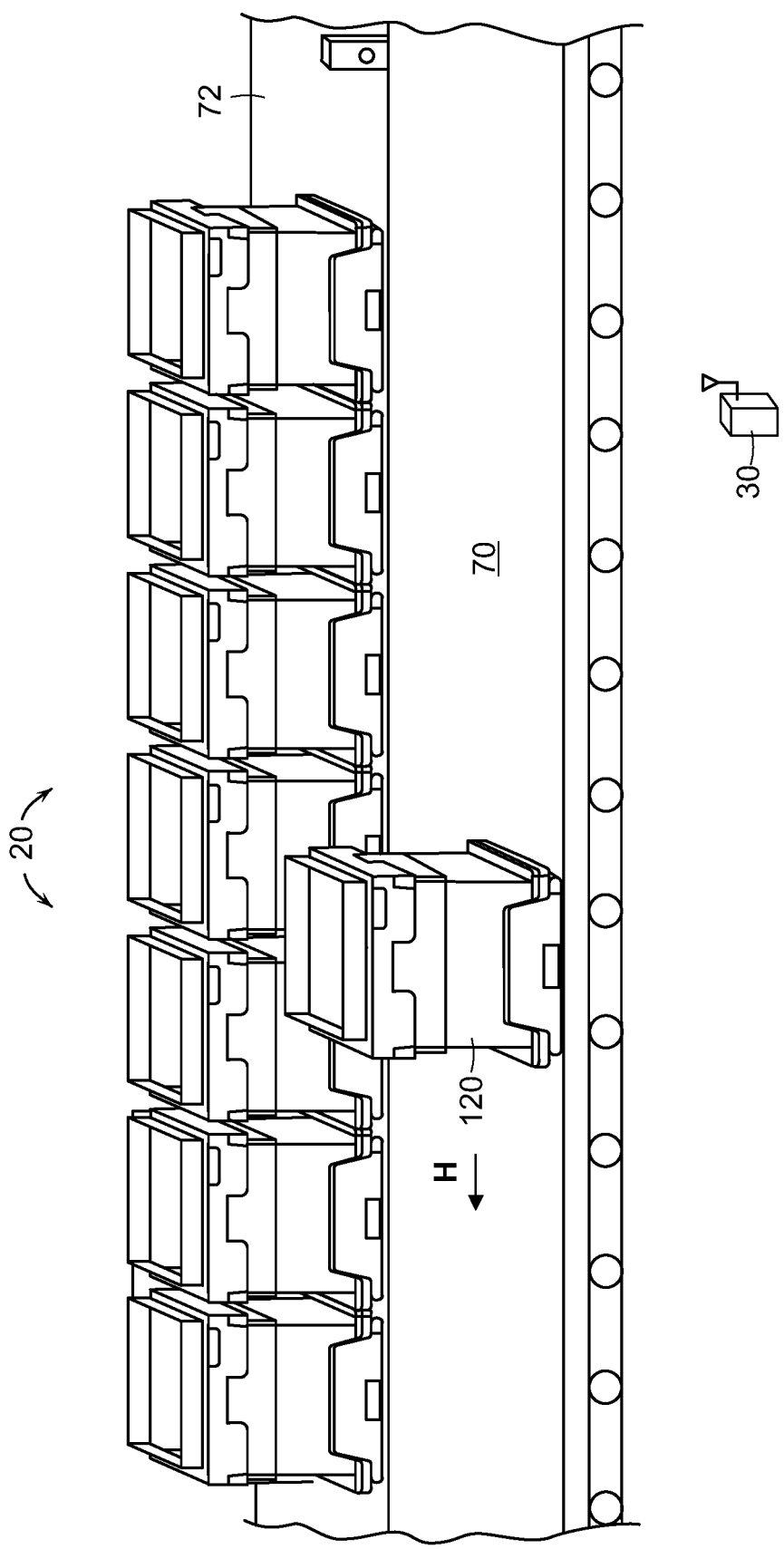

FIG. 24A shows a portion of a system in accordance with another embodiment of the present invention in which box tray assemblies 20 are provided on a conveyor 72 (e.g., 16 or 18 shown in FIG. 1), and an additional conveyor 70 is provided adjacent the conveyor 72 as shown. With reference to FIG. 24B, a box tray assembly 120 may be selectively moved (or kicked) from the conveyor 72 onto the conveyor 70 in a direction F as shown. Once the box 120 is removed from the conveyor 72, the remaining box tray assemblies on the conveyor 72 then move in directions as shown at G in FIG. 24C to fill the space left by the removed box tray assembly 120. With reference to FIG. 24D, the removed box tray assembly 120 may then travel along the conveyor 70 as shown at H for further processing.

Figure 25A:
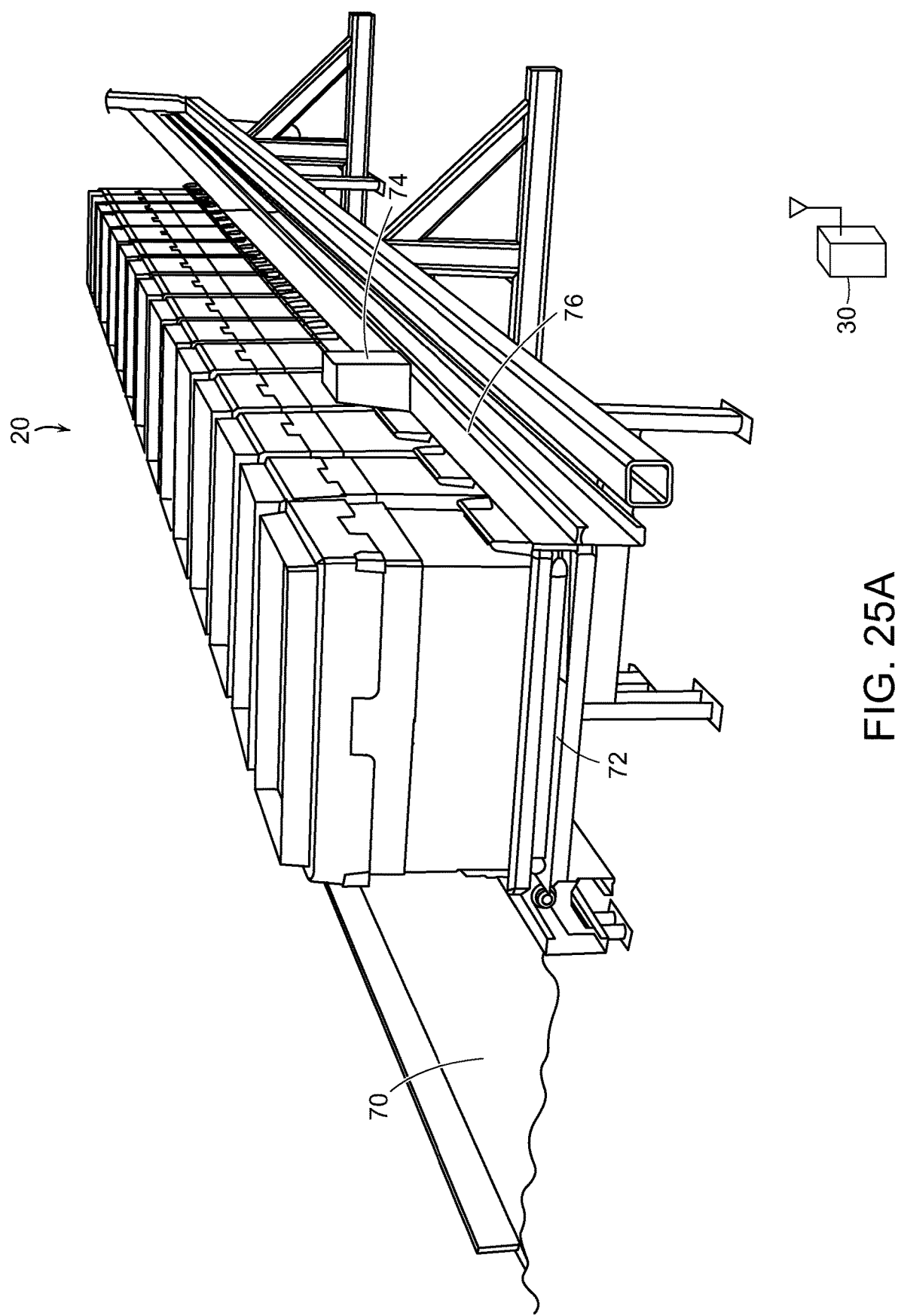
FIGS. 25A and 25B show illustrative diagrammatic isometric views of a box handling system including a box a box kicker assembly in accordance with an embodiment of the present invention.
Figure 25B:
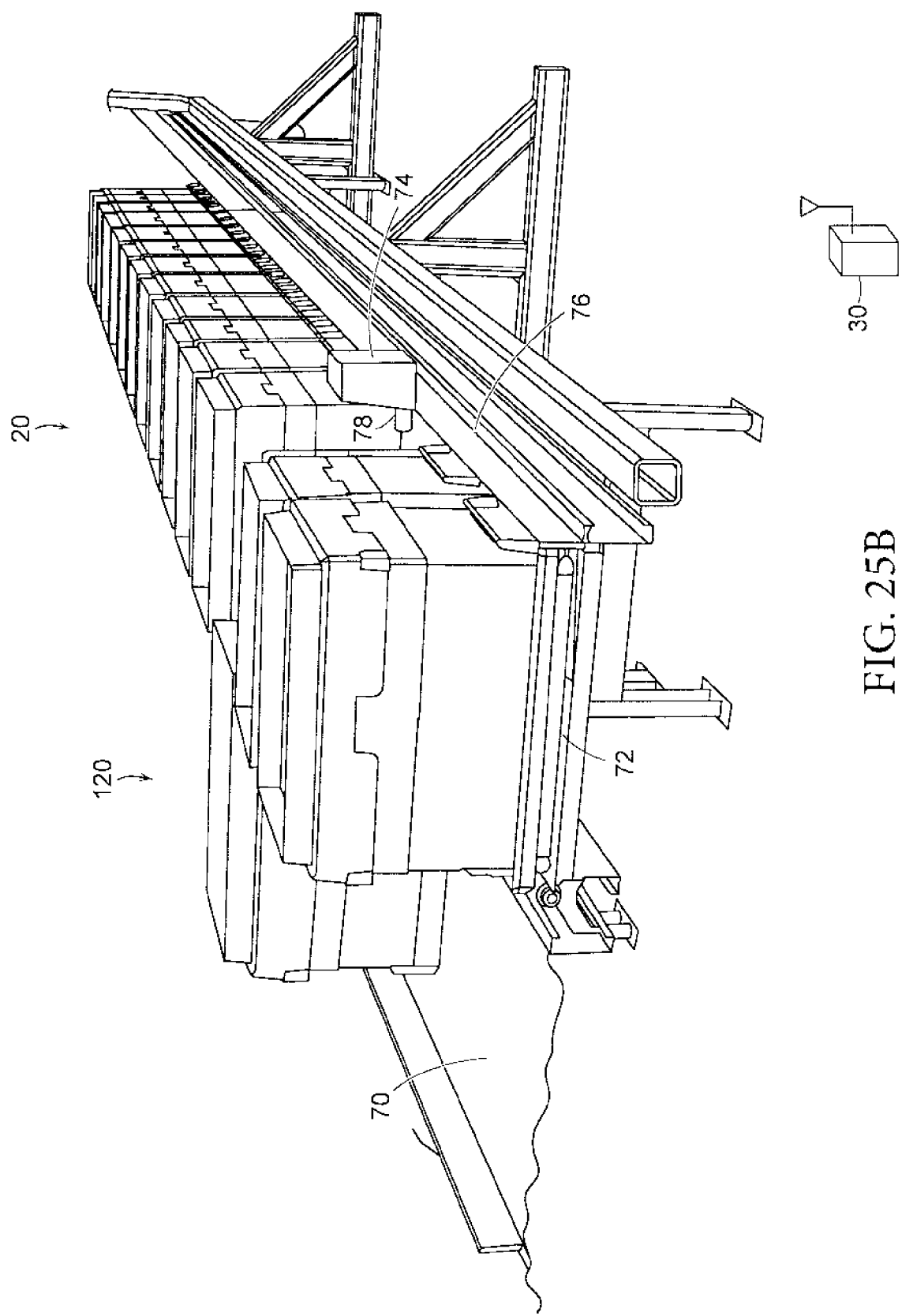

FIGS. 25A and 25B show rear views of the system of FIGS. 24A-24D. In particular, FIG. 25A shows that a box kicker assembly 74 may travel along a track 76 behind the box tray assemblies 20, and with reference to FIG. 25B, the box kicker assembly may be selectively engaged to urge the removal of a box tray assembly from a conveyor. In particular, the box kicker may include an actuatable (e.g., by solenoid) post 78 that is designed to contact a kickerplate portion 51 of a box tray to push the box tray assembly onto the conveyor 70. Such a system may be used to provide that boxes that are empty or finished being unloaded may be removed (e.g., from conveyor 16), or that boxes that are full or finished being loaded may be removed (e.g., from conveyor 18). Operational control of the system is provided by one or more processing systems 30.

Figure 26A:
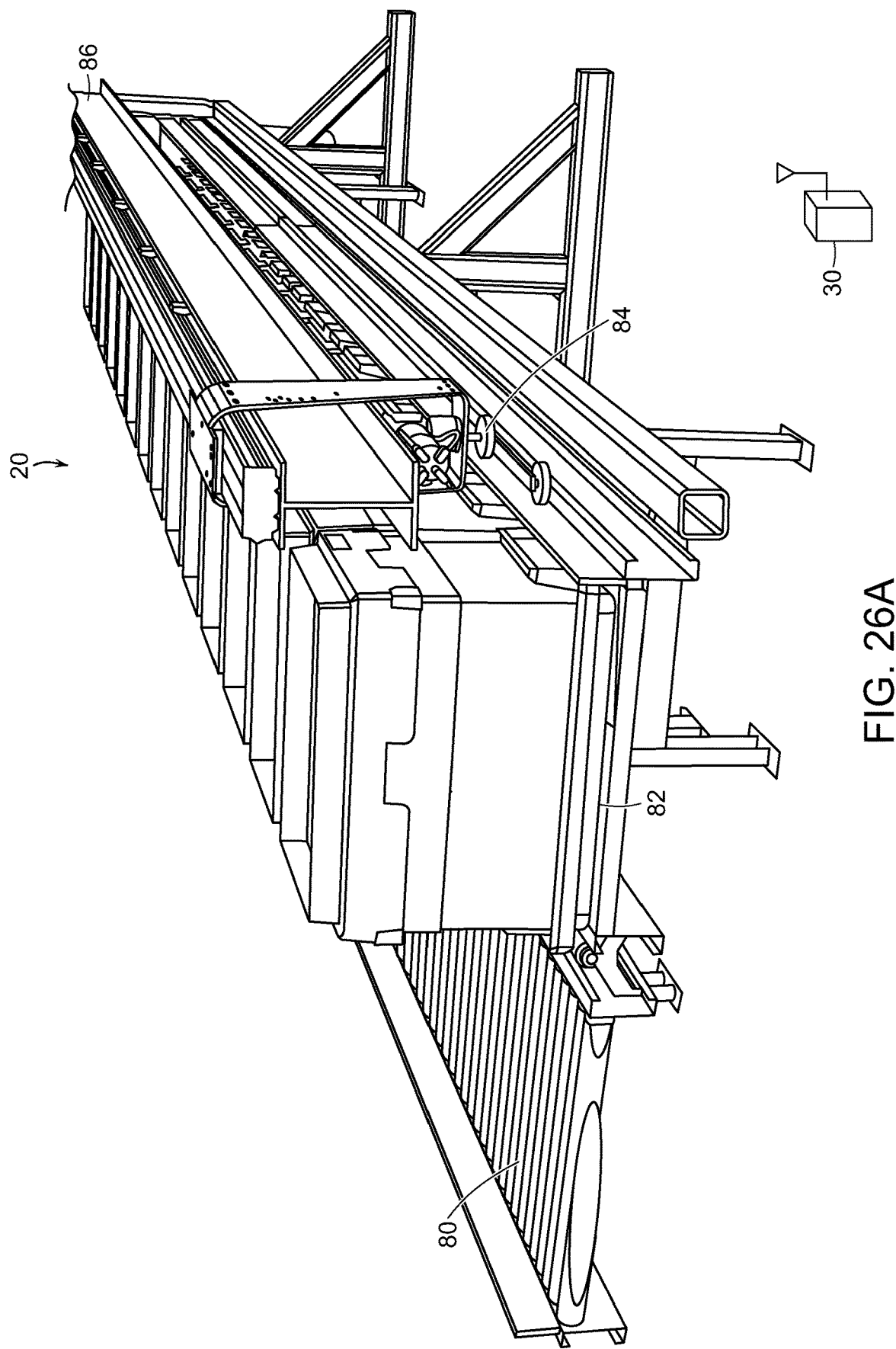
FIG. 26A-FIG. 26D show illustrative diagrammatic isometric views of a box handling system including a box a box kicker assembly in accordance with a further embodiment of the present invention.
Figure 26B:
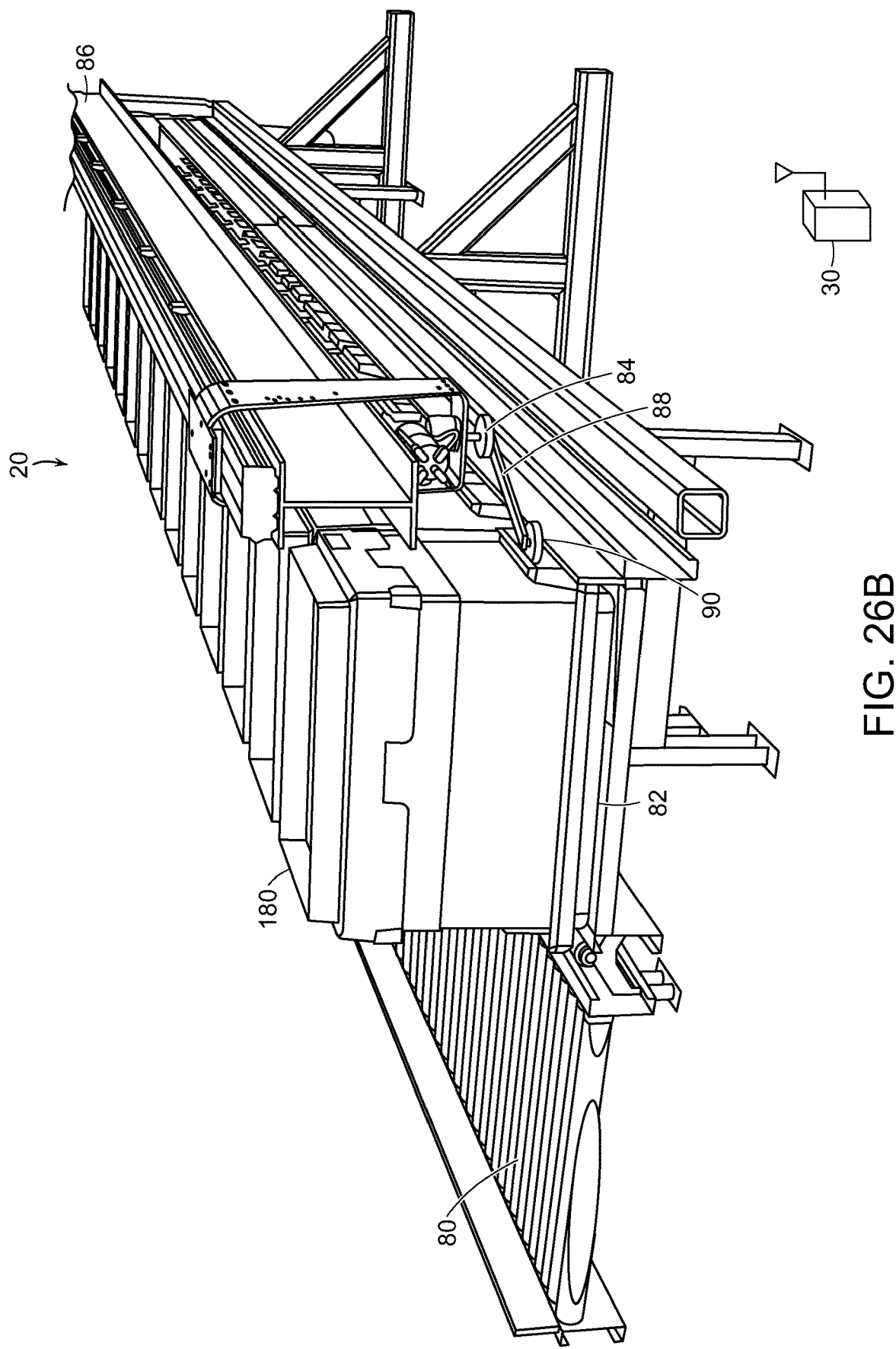
Figure 26C:
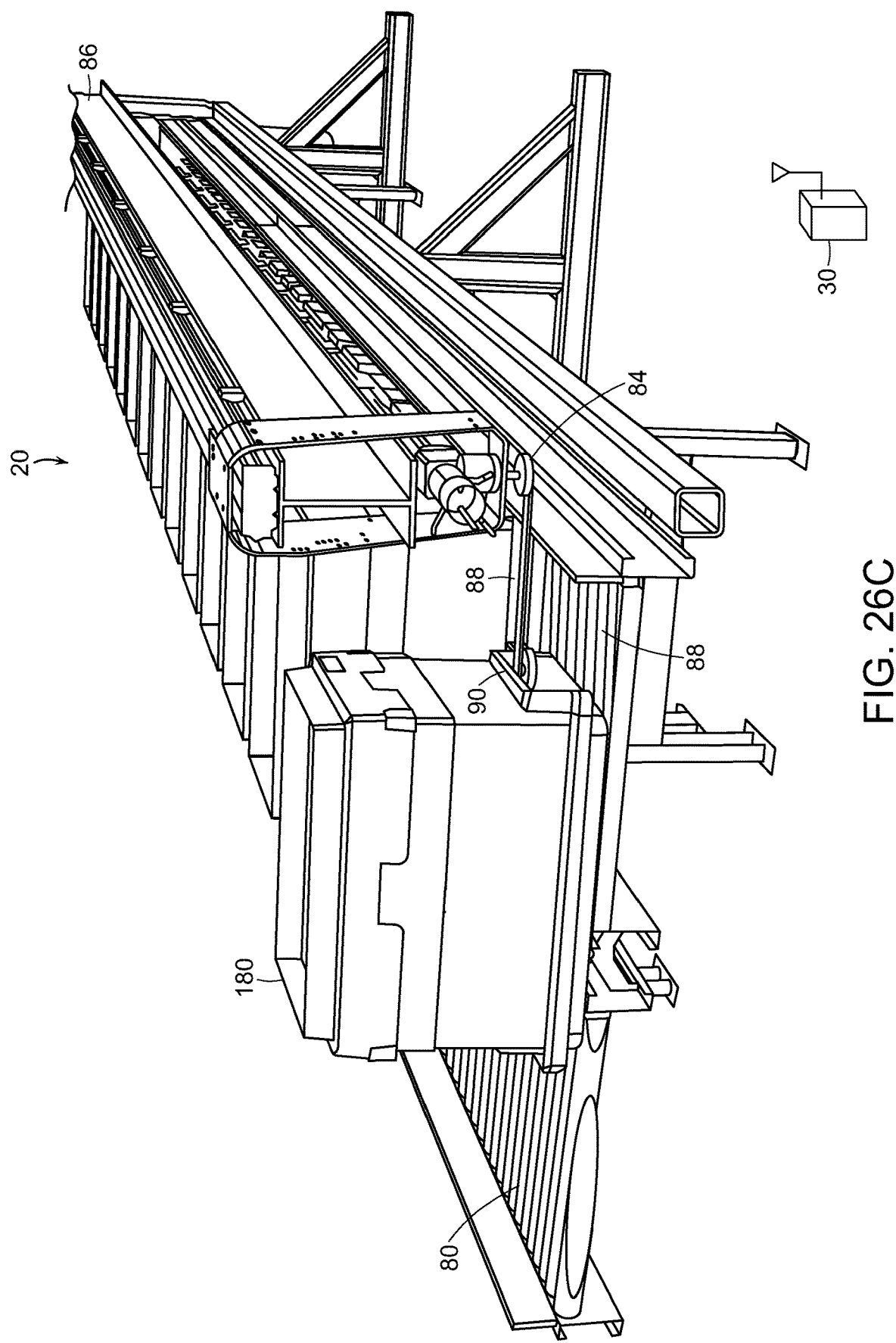
Figure 26D:
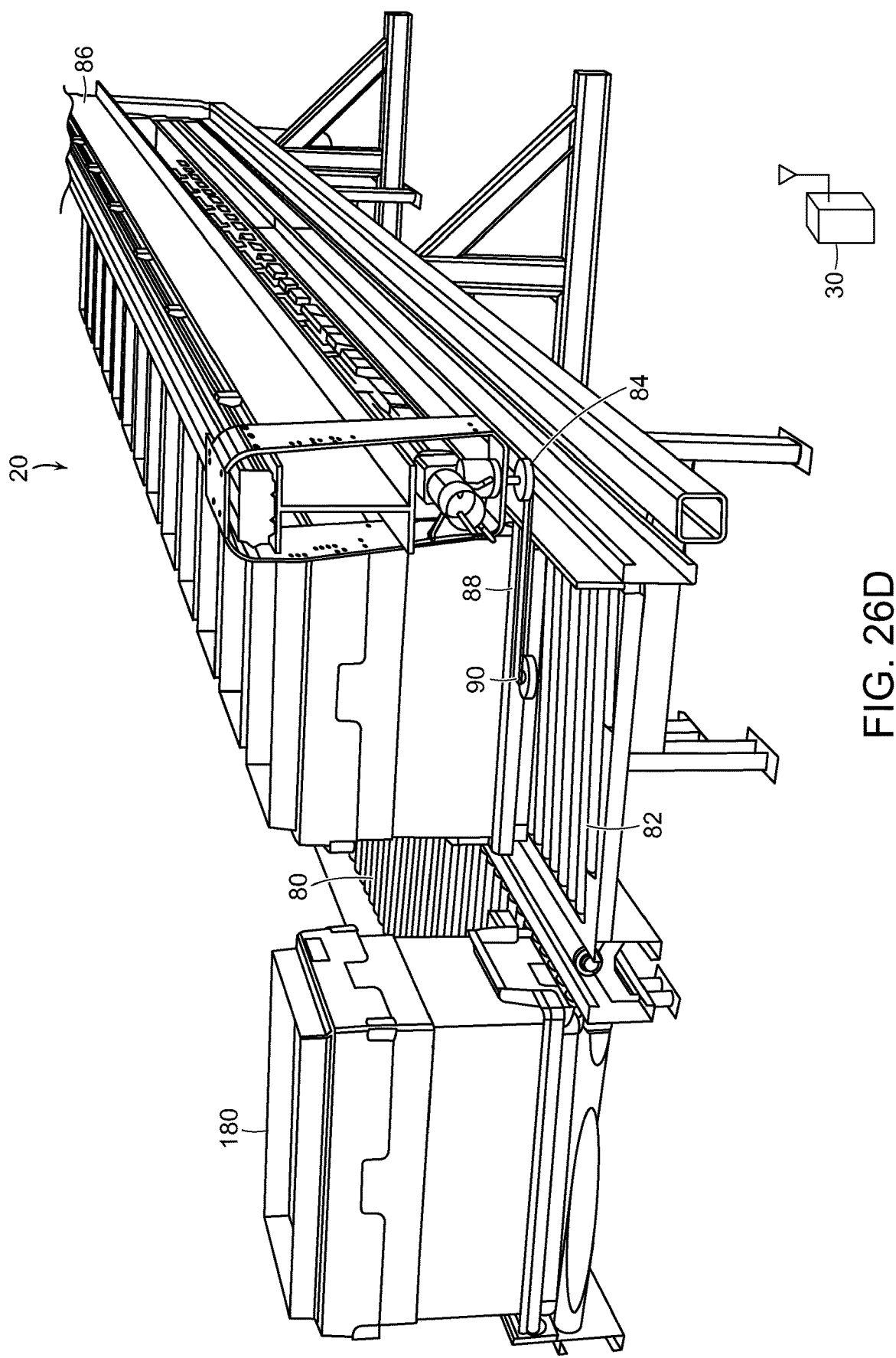

With reference to FIGS. 26A-26D, a box kicker 84 in accordance with another embodiment of the present invention may be suspended by and travel along a track 86, and may include a rotatable arm 88 and a roller wheel 90 at the end of the arm 88. With reference to FIGS. 26B-26D, when the roller 90 contacts the kicker plate 51 of a box tray (of a box tray assembly 180), the arm 88 continues to rotate, urging the box tray assembly 180 from a first conveyor 82 to a second conveyor 80. In particular, when the roller 90 contacts the kicker plate 51 of the box tray, the rotation of the arm 88 causes the box tray to move linearly, and the roller 90 may contact the plate 51 at a single location on the plate 51 until the box tray assembly moves away from the roller 90. Again, the roller is designed to contact a kickerplate portion 51 of a box tray to push the box tray assembly onto the conveyor 80. Such a system may be used to provide that boxes that are empty or finished being unloaded may be removed (e.g., from conveyor 16), or that boxes that are full or finished being loaded may be removed (e.g., from conveyor 18). In accordance with certain embodiments, the box kicker 84 may be positioned between two rows of boxes in box tray assemblies, and the box kicker may be actuated to push a box tray assembly on either side of the two rows onto output conveyors.

In each of the above systems, a controller 30 (e.g., one or more computer processors) may be employed (either wirelessly or wired) to monitor the location and position of each of the box tray assemblies on the conveyors, to control the processing of objects with a programmable motion device, and to maintain status information regarding the processing stages of each of the boxes in the box tray assemblies.

Figure 27A:
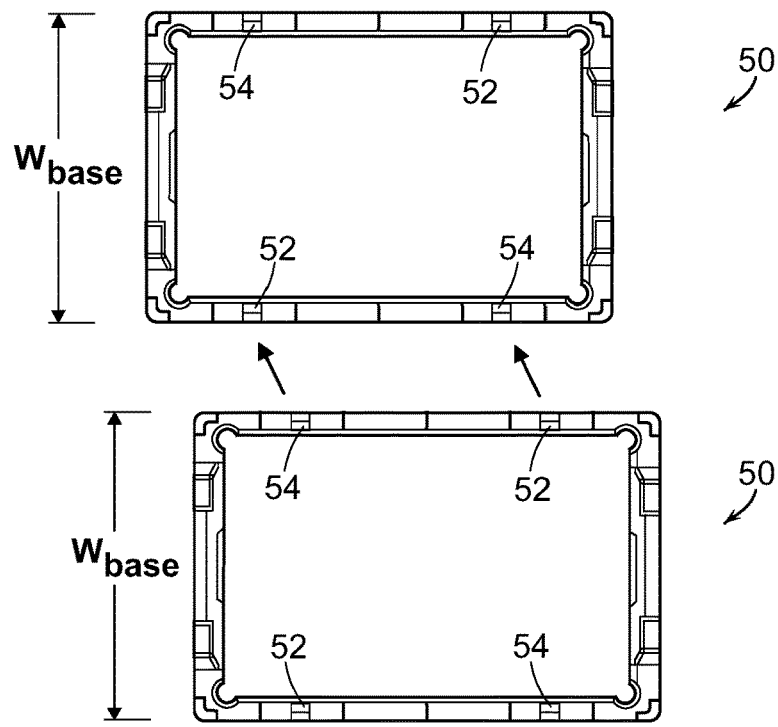
FIGS. 27A and 27B show illustrative diagrammatic top views of box trays in a box handling system including an attraction system for attracting adjacent box trays toward one another in a side-by-side fashion in accordance with an embodiment of the invention.
Figure 27B:
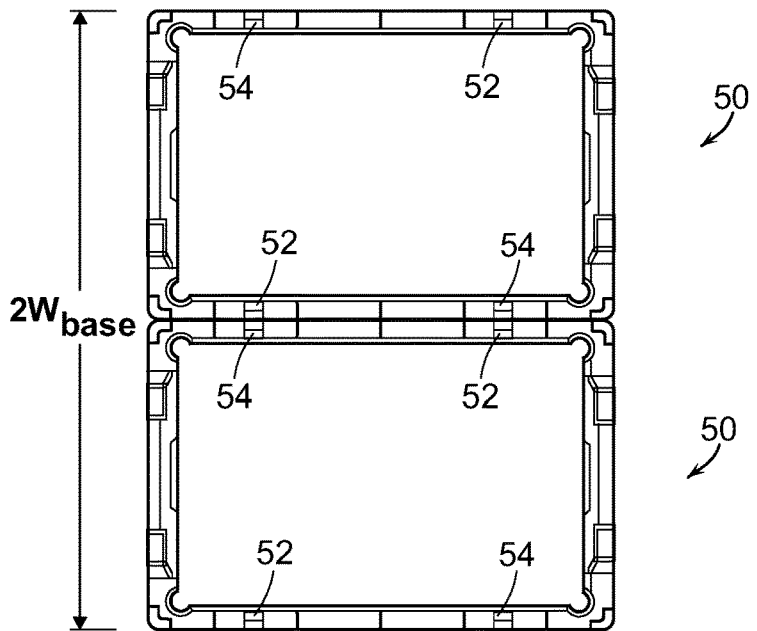

FIGS. 27A and 27B show box trays 50 in accordance with another embodiment of the present invention that include positive field outwardly positioned magnets 52 and negative field outwardly positioned magnets 54. When adjacent box trays are brought toward each other (as shown in FIG. 27B), an attractive force is created by each magnet pair (52, 54) that draws the box trays closed together length-wise, and facilitates holding the box trays in alignment length-wise. The box trays 50 may be used as discussed above with respect to box trays 34.

Figures 28A, 28B:
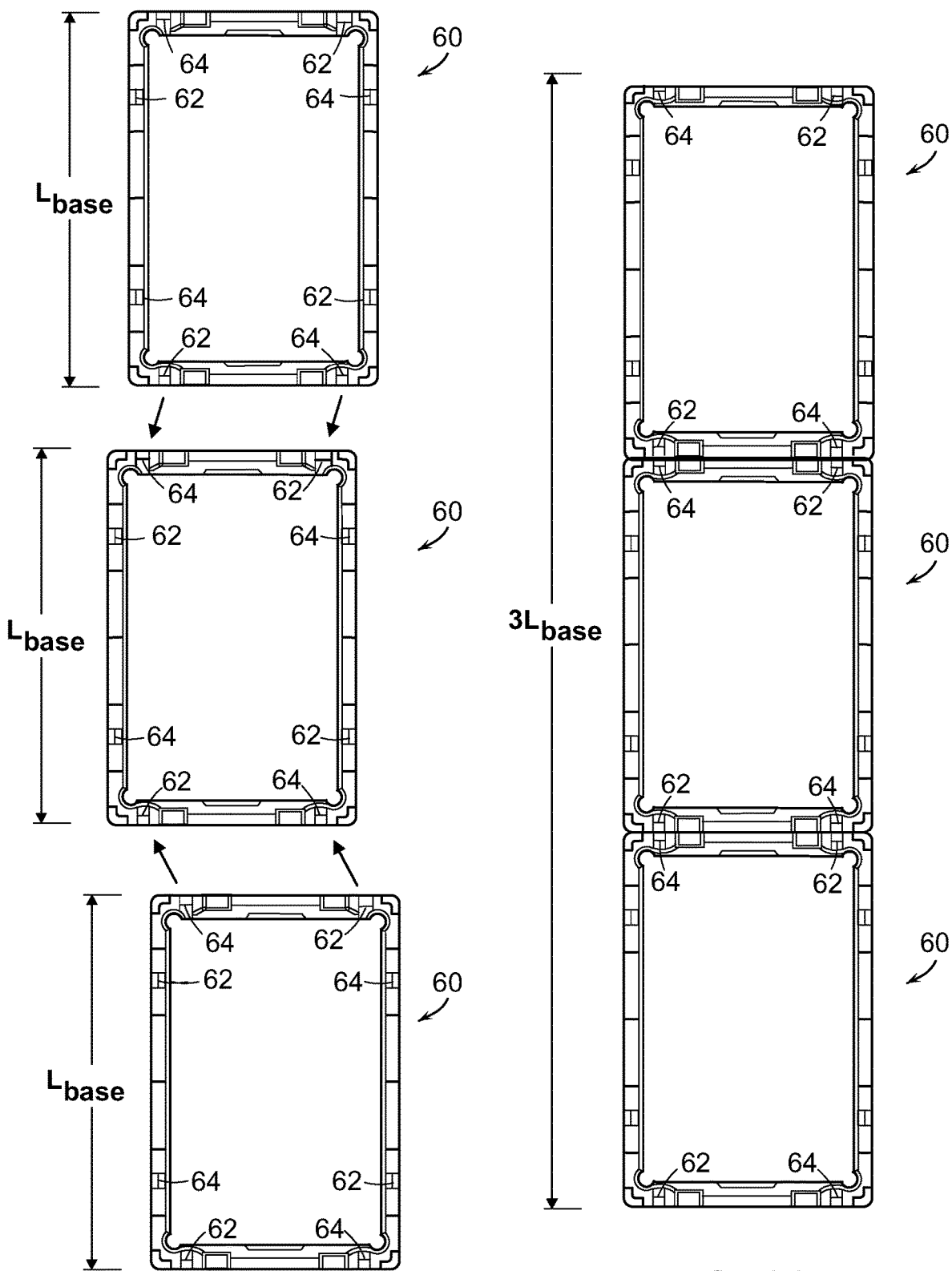
FIGS. 28A and 28B show illustrative diagrammatic top views of box trays in a box handling system including an attraction system for attracting adjacent box trays toward one another in an end-to-end fashion in accordance with another embodiment of the invention.

As shown in FIGS. 28A and 28B, in accordance with a further embodiment of the present invention, box trays 60 may be provided that include positive field outwardly positioned magnets 62 and negative field outwardly positioned magnets 64. When adjacent box trays are brought toward each other (as shown in FIG. 28B), an attractive force is created by each magnet pair (62, 64) that draws the box trays closed together width-wise, and facilitates holding the box trays in alignment width-wise. The box trays 60 may include magnets 62, 64 along both the lengths and widths, may be used as discussed above with respect to box trays 34.

Those skilled in the art will appreciate that numerous modifications and variations may be made to the above disclosed embodiments without departing from the spirit and scope of the present invention.

The invention claimed is:

1. A box handling system, comprising:
    a box having one or more outer flaps provided at a top of the box;
    a box tray including a recessed area for receiving the box, wherein the recessed area includes a plurality of floor and edge portions for receiving the box; and
    a box cover for placement over the top of the box such that the one or more outer flaps of the box are maintained in an open position along an outside of the box, wherein the box cover defines an open top portion that permits access to an interior of the box, wherein the box tray includes box tray identifying indicia uniquely identifying the box tray, wherein the box cover includes a recessed area in which box cover identifying indicia that uniquely identifies the box cover is located, and wherein a processing system records the box cover identifying indicia of the box cover and the box tray identifying indicia of the box tray that hold the box.

2. The box handling system as claimed in claim 1, wherein the box tray is provided on a conveyor.

3. The box handling system as claimed in claim 2, wherein the conveyor includes an adjustable stop to limit a movement of the box tray on the conveyor in a first direction.

4. The box handling system as claimed in claim 1, wherein the box includes box identifying indicia uniquely identifying the box.

5. The box handling system as claimed in claim 1, wherein the processing system associates the box tray identifying indicia of the box tray with a defined set of objects.

6. The box handling system as claimed in claim 5, wherein the defined set of objects are homogenous.

7. The box handling system as claimed in claim 5, wherein the defined set of objects are heterogeneous.

8. The box handling system as claimed in claim 1, wherein the processing system is responsive to perception output from a perception unit for analyzing the box tray identifying indicia.

9. The box handling system as claimed in claim 1, wherein the box tray includes an alignment means for stacking adjacent box trays.

10. The box handling system as claimed in claim 1, wherein the box tray includes an attachment means for attracting adjacent box trays toward the box tray.

11. The box handling system as claimed in claim 1, wherein the box cover includes side wall portions that are received by corner tabs of an adjacent box cover when a plurality of box covers are stacked together.

12. The box handling system as claimed in claim 1, wherein the box cover provides that outer flaps of boxes of multiple sizes may be held in an open position.

13. The box handling system as claimed in claim 1, wherein the box cover provides that multiple sizes of outer flaps of boxes may be held in an open position.

14. The box handling system as claimed in claim 1, wherein the box is able to be filled to a level higher than a height of the box through the box cover.

15. The box handling system as claimed in claim 1, further comprising a kicker assembly that includes an actuatable urging device that is actuatable to selectively move a box tray assembly from a conveyor.

16. The box handling system as claimed in claim 1, wherein the box tray further comprises one or more magnets arranged on one or more of the edge portions of the box tray for magnetically coupling the box tray to an adjacent box tray.

17. A box handling system comprising:
    a box having one or more outer flaps provided at a top of the box;
    a box tray including a recessed area for receiving the box, wherein the recessed area includes a plurality of floor and edge portions for receiving the box, wherein the box tray includes an attachment means for attracting adjacent box trays toward the box tray; and
    a box cover for placement over the top of the box such that the one or more outer flaps of the box are maintained in an open position along an outside of the box, and wherein the box cover defines an open top portion that permits access to an interior of the box.

18. The box handling system as claimed in claim 17, wherein the box tray is provided on a conveyor.

19. The box handling system as claimed in claim 18, wherein the conveyor includes an adjustable stop to limit a movement of the box tray on the conveyor in a first direction.

20. The box handling system as claimed in claim 17, wherein the box tray includes box tray identifying indicia uniquely identifying the box tray.

21. The box handling system as claimed in claim 17, wherein the box includes box identifying indicia uniquely identifying the box.

22. The box handling system as claimed in claim 17, wherein the processing system associates the box tray identifying indicia of the box tray with a defined set of objects.

23. The box handling system as claimed in claim 22, wherein the defined set of objects are homogenous.

24. The box handling system as claimed in claim 22, wherein the defined set of objects are heterogeneous.

25. The box handling system as claimed in claim 17, wherein the processing system is responsive to perception output from a perception unit for analyzing the box tray identifying indicia.

26. The box handling system as claimed in claim 17, wherein the box tray includes an alignment means for stacking adjacent box trays.

27. The box handling system as claimed in claim 17, wherein the box cover includes a recessed area in which box cover identifying indicia that uniquely identifies the box cover is located.

28. The box handling system as claimed in claim 27, wherein a processing system records the box cover identifying indicia of the box cover and the box tray identifying indicia of the box tray that hold the box.

29. The box handling system as claimed in claim 17, wherein the box cover includes side wall portions that are received by corner tabs of an adjacent box cover when a plurality of box covers are stacked together.

30. The box handling system as claimed in claim 17, wherein the box cover provides that outer flaps of boxes of multiple sizes may be held in an open position.

31. The box handling system as claimed in claim 17, wherein the box cover provides that multiple sizes of outer flaps of boxes may be held in an open position.

32. The box handling system as claimed in claim 17, wherein the box is able to be filled to a level higher than a height of the box through the box cover.

33. The box handling system as claimed in claim 17, further comprising a kicker assembly that includes an actuatable urging device that is actuatable to selectively move a box tray assembly from a conveyor.

34. The box handling system as claimed in claim 17, wherein the box tray further comprises one or more magnets arranged on one or more of the edge portions of the box tray for magnetically coupling the box tray to an adjacent box tray.

35. A box handling system comprising:
a box having one or more outer flaps provided at a top of the box;
a box tray including a recessed area for receiving the box, wherein the recessed area includes a plurality of floor and edge portions for receiving the box, and wherein the box tray further comprises one or more magnets arranged on one or more of the edge portions of the box tray for magnetically coupling the box tray to an adjacent box tray; and
a box cover for placement over the top of the box such that the one or more outer flaps of the box are maintained in an open position along an outside of the box, and wherein the box cover defines an open top portion that permits access to an interior of the box.

36. The box handling system as claimed in claim 35, wherein the box tray is provided on a conveyor.

37. The box handling system as claimed in claim 36, wherein the conveyor includes an adjustable stop to limit a movement of the box tray on the conveyor in a first direction.

38. The box handling system as claimed in claim 35, wherein the box tray includes box tray identifying indicia uniquely identifying the box tray.

39. The box handling system as claimed in claim 35, wherein the box includes box identifying indicia uniquely identifying the box.

40. The box handling system as claimed in claim 35, further comprising a processing system that associates the box tray identifying indicia of the box tray with a defined set of objects.

41. The box handling system as claimed in claim 40, wherein the defined set of objects are homogenous.

42. The box handling system as claimed in claim 40, wherein the defined set of objects are heterogeneous.

43. The box handling system as claimed in claim 40, wherein the processing system is responsive to perception output from a perception unit for analyzing the box tray identifying indicia.

44. The box handling system as claimed in claim 35, wherein the box tray includes an alignment means for stacking adjacent box trays.

45. The box handling system as claimed in claim 35, wherein the box tray includes an attachment means for attracting adjacent box trays toward the box tray.

46. The box handling system as claimed in claim 35, wherein the box cover includes a recessed area in which box cover identifying indicia that uniquely identifies the box cover is located.

47. The box handling system as claimed in claim 46, wherein a processing system records the box cover identifying indicia of the box cover and the box tray identifying indicia of the box tray that hold the box.

48. The box handling system as claimed in claim 35, wherein the box cover includes side wall portions that are received by corner tabs of an adjacent box cover when a plurality of box covers are stacked together.

49. The box handling system as claimed in claim 35, wherein the box cover provides that outer flaps of boxes of multiple sizes may be held in an open position.

50. The box handling system as claimed in claim 35, wherein the box cover provides that multiple sizes of outer flaps of boxes may be held in an open position.

51. The box handling system as claimed in claim 35, wherein the box is able to be filled to a level higher than a height of the box through the box cover.

52. The box handling system as claimed in claim 35, further comprising a kicker assembly that includes an actuatable urging device that is actuatable to selectively move a box tray assembly from a conveyor.

* * * * *